(12) United States Patent
Kato et al.

(10) Patent No.: US 6,931,313 B2
(45) Date of Patent: Aug. 16, 2005

(54) VEHICULAR STEERING DEVICE

(75) Inventors: Hiroaki Kato, Hekinan (JP); Minekazu Momiyama, Chiryu (JP); Takayuki Ohta, Okazaki (JP); Yoshiyuki Yasui, Nagoya (JP); Yuzo Imoto, Aichi-ken (JP); Hiroaki Aizawa, Anjo (JP); Eiichi Ono, Toyota (JP); Yuji Muragishi, Nagoya (JP)

(73) Assignees: Toyoda Koki Kabushiki Kaisha, Kariya (JP); Advics Co., Ltd., Kariya (JP)

( * ) Notice: Subject to any disclaimer, the term of this patent is extended or adjusted under 35 U.S.C. 154(b) by 0 days.

(21) Appl. No.: 10/932,114

(22) Filed: Sep. 2, 2004

(65) Prior Publication Data

US 2005/0071061 A1 Mar. 31, 2005

(30) Foreign Application Priority Data

Sep. 12, 2003 (JP) .............................. 2003-321872

(51) Int. Cl.[7] .............................................. G06F 7/00
(52) U.S. Cl. ...................... 701/41; 701/42; 180/443; 180/446
(58) Field of Search .............................. 701/36, 41, 42, 701/44, 70, 72, 91; 180/443, 444, 446, 445, 180/197

(56) References Cited

U.S. PATENT DOCUMENTS 5,265,019 A  11/1993  Harara et al.
6,155,377 A * 12/2000 Tokunaga et al. ........... 180/446
6,240,350 B1 * 5/2001 Endo ........................... 701/41
6,415,212 B2 * 7/2002 Nishizaki et al. ............. 701/41
6,415,215 B1 * 7/2002 Nishizaki et al. ............. 701/70
6,556,911 B2 * 4/2003 Matsuno ....................... 701/80
6,792,343 B2 * 9/2004 Yasui et al. ................... 701/71
2002/0029102 A1  3/2002  Badenoch

FOREIGN PATENT DOCUMENTS

| DE | 41 34 390 A1 | 4/1992 |
|---|---|---|
| EP | 1 232 930 A2 | 8/2002 |
| JP | 11-99956 | 4/1999 |
| JP | 2000-62597 | 2/2000 |
| JP | 2000-108863 | 4/2000 |
| JP | 2002-254964 | 9/2002 |

OTHER PUBLICATIONS

Shiro Sasaki, Automobile Technical Handbook vol. 1 Foundation and Theoretical Edition, 5 pages, Dec. 1, 1990.

* cited by examiner

Primary Examiner—Richard M. Camby
(74) Attorney, Agent, or Firm—Oblon, Spivak, McClelland, Maier & Neustadt, P.C.

(57) ABSTRACT

A first ECU 30 detects a steering torque applied to a steering system, estimates a self-aligning torque generated in a front wheel on the basis of the steering torque, and estimates a side force for the front wheel on the basis of lateral acceleration and a yaw rate. The first ECU 30 estimates a grip factor $\epsilon$ for the front wheel on the basis of a change of the self-aligning torque to the side force. The first ECU 30 judges whether the grip factor is below a second OS (oversteer) start threshold value. A second ECU 40 controls the transfer ratio according to the vehicle state when the grip factor is less than the second OS start threshold value.

8 Claims, 16 Drawing Sheets

US 6,931,313 B2

VEHICULAR STEERING DEVICE

CROSS-REFERENCE TO RELATED APPLICATIONS

This application is based upon and claims the benefit of priority from prior Japanese Patent Application No. 2003-321872, filed on Sep. 12, 2003, the entire contents of which are incorporated herein by reference.

BACKGROUND OF THE INVENTION

The present invention relates to a vehicular steering device comprising a unit, which changes a transfer ratio between a steering angle of a steering wheel and a steered angle of a steered wheel, in a steering transmission system which couples a steering member, such as the steering wheel, and the steered wheel by the drive of an electric motor.

Up to now, for the purpose of the progress in drivability and safety of a vehicle, for example, an intelligent front steering control (IFS control) has been proposed, the intelligent front steering control which steers a steered wheel (front wheel) by detecting vehicle state quantities such as a yaw rate and a car body slip angle, and feeding back the vehicle state quantities. For example, what is known as an embodiment of such IFS control is a device of embodying such IFS control in a vehicular steering device comprising a variable transfer ratio mechanism which can change a transfer ratio between a steering angle of a steering wheel and a steered angle (this is also referred to as a rudder angle) of a steered wheel according to a vehicle speed etc.

For example, this device makes it possible to perform prompt steering at the time of low speed driving by relatively accelerating a change of a steered angle of a steered wheel to that of a steering wheel, and raises operation stability at the time of high speed driving by relatively slowing the change of the steered angle of the steered wheel to that of the steering wheel. Moreover, this steering device detects vehicle state quantities such as a yaw rate and a car body slip angle, estimates a state of a steering characteristic (oversteer, understeer, neutral steer) on the basis of this detection result, changes the transfer ratio by switching the IFS control according to the steering characteristics at that time, and improves the drivability and stability of the vehicle. Thus, when judging whether the IFS control is to be switched, it is made to switch the IFS control when the detected yaw rate or slip angle exceeds a control start threshold value.

For example, when a steering characteristic becomes an oversteer tendency, a steering device controls a steering wheel so that the steering characteristic may become counter steering, when the yaw rate or slip angle exceeds the control start threshold value.

By the way, there is a case that the stability of a vehicle deteriorates a little although a driver does not sense a danger when he/she rapidly turns or returns the steering wheel on a high $\mu$ road, or on a road having a high coefficient of friction. In such a case, the steering characteristic shows an understeer tendency or an oversteer tendency. Moreover, at that time, the steering characteristic becomes an oversteer tendency when the steering wheel is returned, and for example, a value based on the yaw rate or slip angle which is used as a trigger at the time of switching the IFS control may exceed the control start threshold value. Moreover, similarly, when a vehicle is largely circled at low speed at the time of a U-turn, the steering characteristic becomes an oversteer tendency when the steering wheel is returned, and a value based on the yaw rate or slip angle may exceed the control start threshold value. In this way, there is a problem that operability gets worse in an area where the stability of the vehicle deteriorates a little although a driver does not sense a danger since, conventionally, the IFS control is executed, for example, unnecessary counter steering is performed although the grip of the steered wheel is sufficient.

SUMMARY OF THE INVENTION

The present invention aims at providing a vehicular steering device that detects a grip factor of a steered wheel besides conventional vehicle state quantities, does not perform the unnecessary intervention of the IFS control in an area where vehicle stability on a high $\mu$ road deteriorates a little by using this grip factor, and performs the IFS control only in a situation that the grip factor drops and the vehicle becomes unstable.

In order to solve the problems, a first aspect of the present invention provides a vehicular steering device that includes steering means, a steering transmission system, a steering system, and a steered wheel. The steering transmission system includes an electric motor and couples the steering means and a steering wheel. The steering system includes the steering means, a suspension, and components therebetween. The steering device includes change means, state quantity detection means, control means, steering index detection means, self-aligning torque estimation mean, steered wheel index estimation mean, grip factor estimation means, and judging means. The change means is provided in the steering transmission system, and is used for changing a transfer ratio between a steering angle of the steering means and a steered angle of the steered wheel by the drive of the electric motor. The state quantity detection means detects vehicle state quantity which represents a vehicle state. The control means controls the electric motor and changes the transfer ratio according to the vehicle state quantity. The steering index detection means detects at least one steering index among steering indices containing a steering torque and a steering force which are applied to the steering system. The self-aligning torque estimation means estimates a self-aligning torque generated in the steered wheel on the basis of the steering index. The steered wheel index estimation means estimates at least one steered wheel index among steered wheel indices including a side force and a steered wheel slip angle to the steered wheel on the basis of the vehicle state quantity. The grip factor estimation means estimates a grip factor at least to the steered wheel on the basis of a change of the self-aligning torque to the steered wheel index. The judging means judges whether the grip factor is less than a first predetermined threshold value. The control means controls the transfer ratio according to the vehicle state when the grip factor is less than the first predetermined threshold value.

A steering device according to a second aspect of the present invention includes change means, state quantity detection means, vehicle speed detection means for detecting vehicle speed, control means, steering index detection means, self-aligning torque estimation means, steered wheel index estimation means, grip factor estimation means, and judging means. The state quantity detection means is provided in the steering transmission system and is used for changing a transfer ratio between a steering angle of the steering means and a steered angle of the steered wheel by the drive of the electric motor. The state quantity detection means detects a vehicle state quantity which represents a vehicle state. The control means controls the electric motor and changing the transfer ratio according to the vehicle speed and the vehicle state quantities. The steering index detection means detects at least one steering index among steering indices containing a steering torque and a steering force which are applied to the steering system. The self-aligning torque estimation means estimates a self-aligning torque generated in the steered wheel on the basis of the steering index. The steered wheel index estimation means estimates at least one steered wheel index among steered wheel indices including a side force and a steered wheel slip angle to the steered wheel on the basis of the vehicle state quantity. The grip factor estimation means estimates a grip factor at least to the steered wheel on the basis of a change of the self-aligning torque to the steered wheel index. The judging means judges whether the grip factor is less than a first predetermined threshold value.

The control means controls the transfer ratio according to the vehicle state when the grip factor is less than the first predetermined threshold value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, an embodiment of a steering device of the present invention will be described with reference to drawings. In each following embodiment, an example that the present invention is applied to an electric power steering device (hereinafter, this is simply referred to as a steering device) for a vehicle such as an automobile will be explained.

First Embodiment

Hereafter, a first embodiment will be explained with reference to FIGS. 1 to 13.

(1) Hardware Constitution of Steering Device 20

Figure 1:
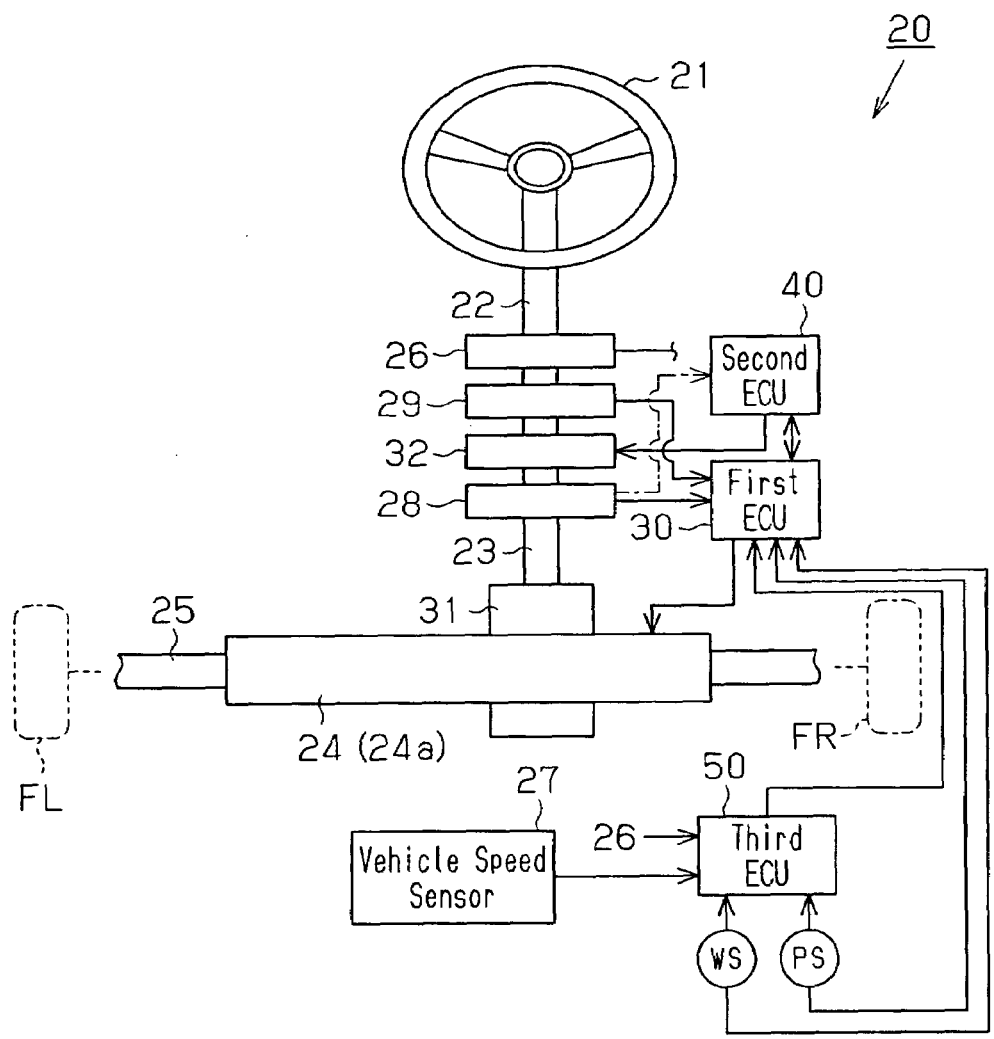
FIG. 1 is an entire schematic diagram showing a steering device 20 of a first embodiment of embodying the present invention.

As shown in FIG. 1, the steering device 20 comprises a steering wheel 21, a first steering shaft 22, a second steering shaft 23, a rod 25, a steering angle sensor 26, an output angle sensor 28, a steering torque sensor 29, and an IFS actuator 32. Thus, an end of the first steering shaft 22 is connected to the steering wheel 21. An input side of the IFS actuator 32 is connected to the first steering shaft 22. The steering wheel 21 is equivalent to the steering means. In addition, IFS stands for Intelligent Front Steer. The IFS actuator 32 comprises an electric motor 32a (refer to FIG. 4) and a reducer, one end of the second steering shaft 23 is connected to its output side, and an input side of a steering gear box 31 is connected to another end of the second steering shaft 23. The steering gear box 31 comprises a rack-and-pinion gear which is not shown. Thus, the steering gear box 31 converts rotary motion, inputted from the second steering shaft 23, to the axial motion of the rod 25, having steered wheels FR and FL (front wheels) and outputs the axial motion. The IFS actuator 32 constitutes the variable transfer ratio mechanism (variable transfer ratio means).

In addition, the transfer ratio will be also referred to as a steering gear ratio for the convenience of explanation. The greater the steering gear ratio is, the smaller the steered angle of the steered wheels relative to that of the steering wheel becomes.

A rotation angle (steering angle) of the first steering shaft 22 is detected by the steering angle sensor 26, and is inputted into the third ECU 50 as a steering angle signal. Moreover, a rotation angle of the second steering shaft 23 is detected by the output angle sensor 28, and is inputted into the first ECU 30 as an output angle signal. Furthermore, vehicle speed V is detected by the vehicle speed sensor 27, and is inputted into the third ECU 50 as a vehicle speed signal (refer to FIG. 4). The vehicle speed sensor is equivalent to the vehicle speed detection means.

The "variable transfer ratio mechanism which is arranged in the steering transmission system which couples the steering wheel, and steered wheels FR and FL and changes the transfer ratio by the drive of the electric motor" is referred to as a variable gear Ratio system.

The IFS actuator 32 changes a ratio of an output angle of the second steering shaft 23 to an steering angle of the first steering shaft 22 by changing a ratio of an output gear to an input gear in real time according to the vehicle speed V by the electric motor 32a and reducer.

The steering angle signal by the steering angle sensor 26 and the vehicle speed signal by the vehicle speed sensor 27 are inputted into the second ECU 40 from the third ECU 50 through a communication bus. The second ECU 40 determines an ACT angle command value θ0* corresponding to a target rotation angle of the electric motor 32a of the IFS actuator 32, which is uniquely determined in correspondence to the steering angle and vehicle speed V, from a map (not shown) of the vehicle speed versus the steering gear ratio, and supplies a motor voltage according to the determined ACT angle command value θ0* to a motor drive circuit AC2 (refer to FIG. 4) through amplification means.

According to the vehicle speed versus steering gear ratio map, a correspondence that the steering gear ratio becomes large as a vehicle speed V becomes large is set. Accordingly, when the steering gear ratio is set according to the grip factor, setting is performed so that the steering gear ratio may become large as the vehicle speed V becomes high.

Thus, it is possible to set the steering gear ratio corresponding to the vehicle speed V, for example, so that the output angle of the IFS actuator 32 may become large to the steering angle of the steering wheel 21 at the time of stop or low speed driving, and so that the output angle of the IFS actuator 32 may become small to the steering angle of the steering wheel at the time of high speed driving.

The steered amount of the steered wheels FR and FL, that is, the steered angle of the steered wheels is proportional to the output angle of the IFS actuator 32. In consequence, for example, when a vehicle is stopped or driven at low speed, the steering gear ratio is set by the IFS actuator 32 to be small, and hence, since the steered wheels FR and FL are largely turned even if the steering angle by the steering wheel 21 is small, a driver can easily perform steering. In addition, when a vehicle is driven at high speed, the steering gear ratio is set by the IFS actuator 32 to be large, and hence, since the steered wheels are turned small even if the steering angle by the steering wheel 21 is large, it is possible to keep the stability of vehicle behavior.

Moreover, the EPS actuator 24 comprises a motor 24a constituted so as to be coaxial with the rod 25, and assists the steering by generating an assist force according to a steering condition by being controlled by the first ECU 30. The motor 24a comprises a brushless DC motor.

That is, the steering device 20 has a function of performing the variable control of the steering gear ratio according to the vehicle speed with the IFS actuator 32 by the variable transfer ratio control processing executed by the second ECU 40. In addition, the steering device 20 also has a function of assisting the steering by generating the assist force according to the steering condition with the EPS actuator 24 by the steering control executed by the first ECU 30. The second ECU 40 is equivalent to the variable transfer ratio control means.

(2) Electric Constitution of Steering Device 20 and Peripherals

Figure 4:
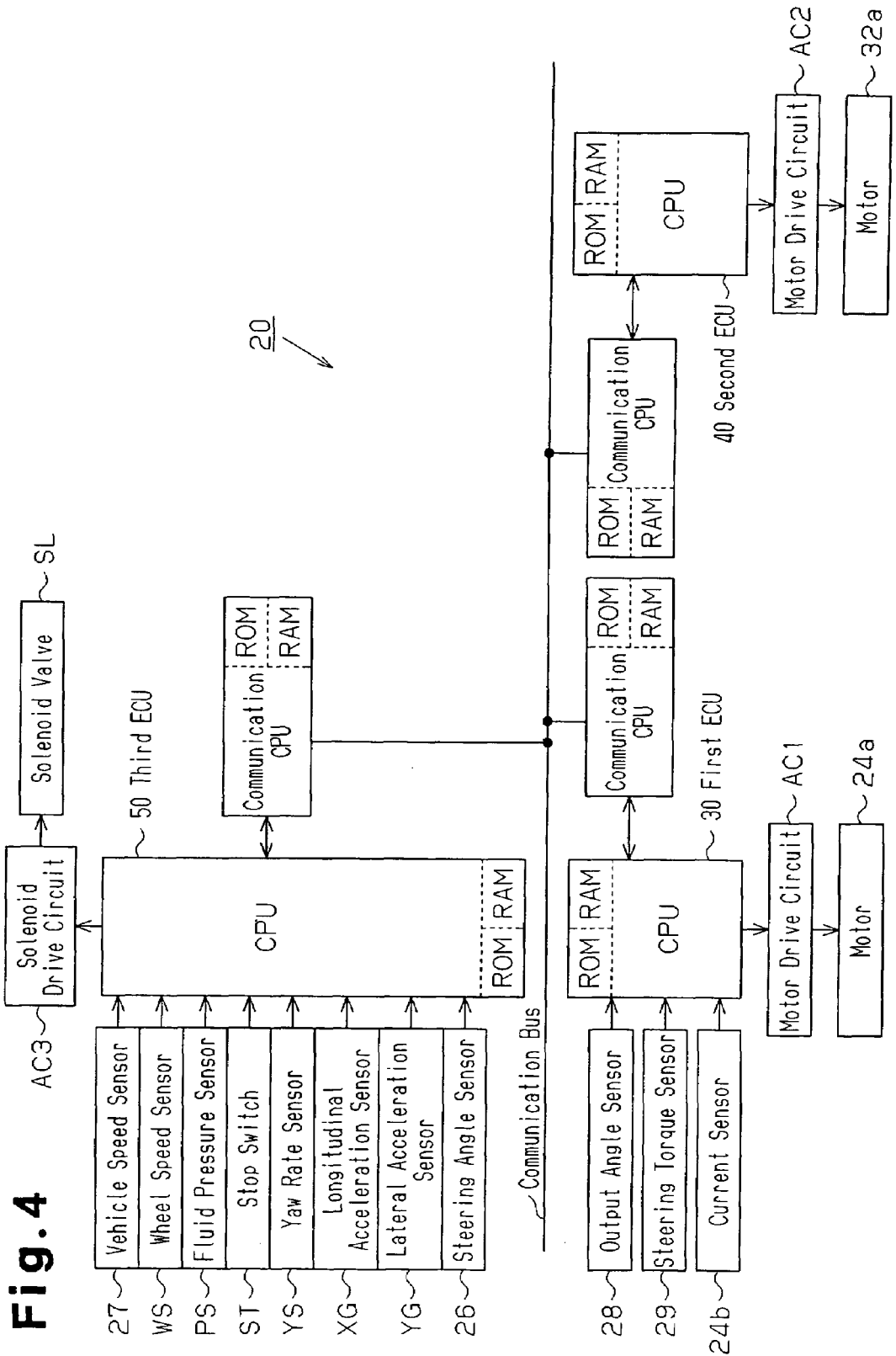
FIG. 4 is an electric block diagram of the steering device 20 similarly.

FIG. 4 shows the system of this embodiment. As shown in this diagram, since respective ECUs of systems such as a control system of the steering device 20, and a brake control system are connected mutually through the communication bus, and hence, the control systems can share mutual system information between the respective systems.

(3) Electric Constitution of Control System of Steering Device 20

The control system of the steering device 20 comprises the first ECU 30, which is an electric steering control unit comprising a CPU, ROM, and RAM, and the second ECU 40 for variable transfer ratio control comprising a CPU, ROM, and RAM.

The output angle sensor 28, the steering torque sensor 29, and a current sensor 24b are connected to the first ECU 30. As shown in FIG. 4, the output angle sensor 28 shown in FIG. 1 detects the rotation angle of the second steering shaft 23, that is, the output angle outputted from the IFS actuator 32, and outputs an output angle signal to the first ECU 30. In addition, the steering torque sensor 29 detects the steering torque which acts on the first steering shaft 22, and outputs a steering torque signal to the first ECU 30. Furthermore, although not being shown in FIG. 1, the current sensor 24b which detects a motor current which flows into the motor 24a also outputs a motor current signal according to the detection to the first ECU 30 as shown in FIG. 4.

In this way, while the output angle, steering torque, and motor current are inputted as signals respectively, the steering angle and vehicle speed are inputted into the first ECU 30 by communication from the third ECU 50. Then, the first ECU 30 calculates an assist current command value which can make the motor 24a generate the assist force according to the steering conditions, vehicle speed V, and motor current by a well-known method, further adds various kinds of current command values to this current command value, outputs the sum to a motor drive circuit AC1 (refer to FIG. 4), and controls the motor 24a.

The second ECU 40 determines the target rotation angle of the electric motor 32a of the IFS actuator 32, which is uniquely determined in correspondence to the steering angle and vehicle speed V by the variable transfer ratio control processing, from the map of the vehicle speed versus steering gear ratio. Then, the second ECU 40 supplies a motor voltage according to the determined ACT angle command value θ0* to the motor drive circuit AC2 (refer to FIG. 4) through amplification means.

In addition, the first ECU 30 is equivalent to the steering force index detection means, self-aligning torque estimation means, front wheel index estimation means, grip factor estimation means, judging means, oversteer judging means, understeer judging means, target vehicle state quantity estimation means, correction value calculation means, and grip factor-responsive value calculation means for the present invention.

(4) Electric Constitution of Brake Control System

On the other hand, the brake control system comprises a brake control unit ECU (hereinafter, a third ECU 50) having a CPU, ROM, and RAM for brake control, and a wheel speed sensor WS, a fluid pressure sensor PS, a stop switch ST, a yaw rate sensor YS, a longitudinal acceleration sensor XG, and a lateral acceleration sensor YG, which are connected to the third ECU 50. Moreover, to the third ECU 50 are connected the steering angle sensor 26 and the vehicle speed sensor 27. As shown in FIG. 4, the steering angle sensor 26 shown in FIG. 1 detects the rotation angle of the first steering shaft 22, that is, the steering angle inputted to the IFS actuator 32, and outputs a steering angle signal to the third ECU 50. Moreover, as shown in FIG. 4, the vehicle speed sensor 27 shown in FIG. 1 also outputs a detected vehicle speed signal of a vehicle to the third ECU 50. Moreover, various sensors of the wheel speed sensor WS, the fluid pressure sensor PS, stop switch ST, yaw rate sensor YS, the longitudinal acceleration sensor XG, and the lateral acceleration sensor YG output detection signals to the third ECU 50, respectively. In addition, WS is used on behalf of WS1 to WS4. Thus, the wheel speed sensors WS1 to WS4 detect the wheel speed of steered wheels FR and FL (front wheels), and rear wheels RR and RL respectively, and output the detection signals to the third ECU 50.

In addition, solenoid valves SL1 to SL8 are connected to the third ECU 50 through a solenoid drive circuit AC3 (in FIG. 4, SL is used as a representative). In addition, the first ECU 30, the second ECU 40, and the third ECU 50 of the control system of the steering device 20 are connected to the communication bus through each communication unit having a CPU, ROM, and RAM for communication to be constituted so that mutual system information can be shared between respective systems. In the brake control system, varieties of information, such as information on a braking force which each wheel generates is obtained, and various types of control such as anti skid control (ABS), traction control (TRC), and vehicle stability control (VSC) is executed on the basis of these. Moreover, various kinds of information necessary for the control system of the steering device 20 can be also transmitted from the brake control system.

(5) Brake Fluid Pressure Controller

Figure 5:
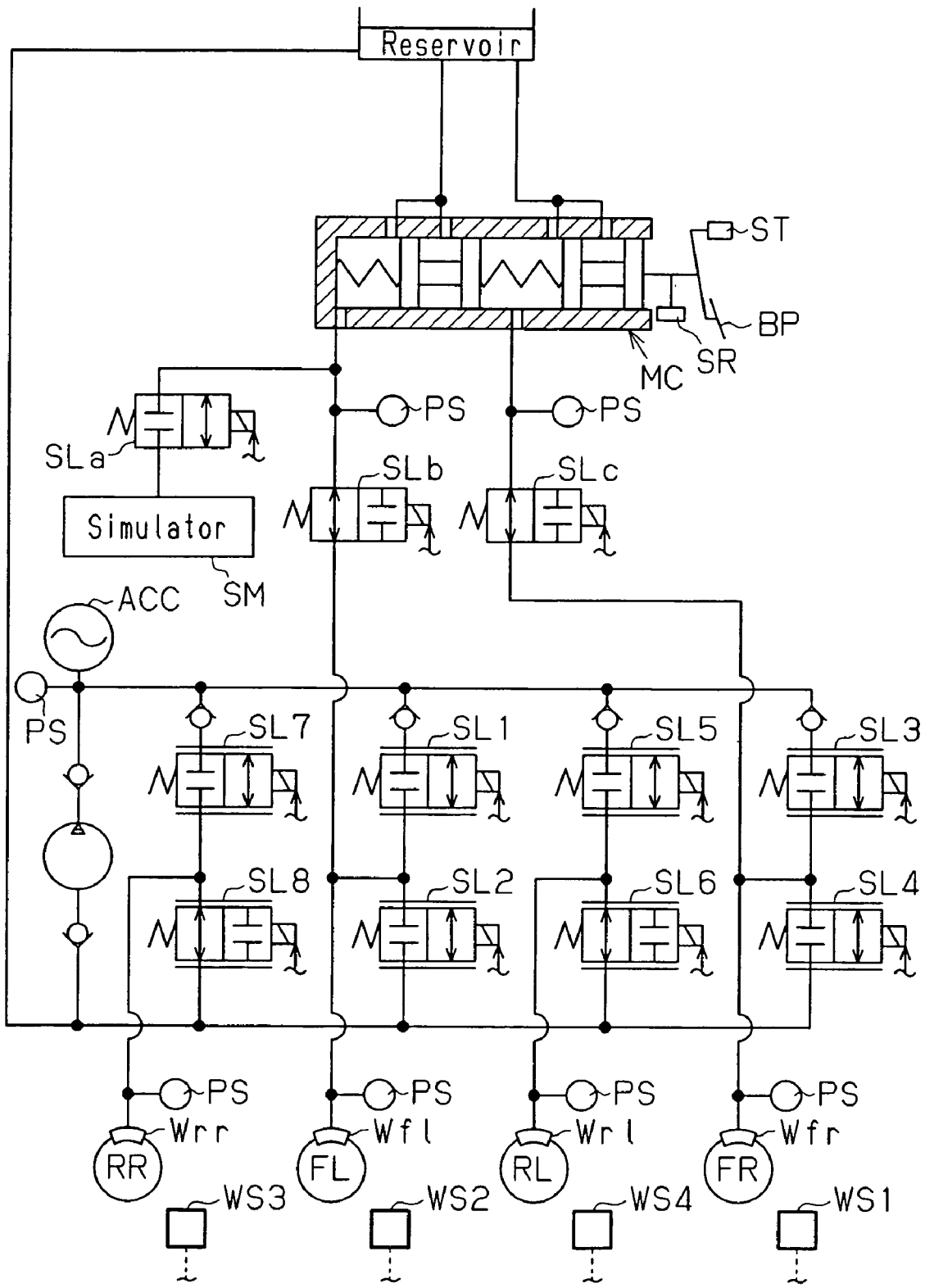
FIG. 5 is a structural diagram showing a brake fluid pressure controller.

The mechanical constitution of the brake fluid pressure controller which constitutes the brake control system will be explained with reference to FIG. 5. FIG. 5 is a structural diagram showing the brake fluid pressure controller.

FIG. 5 shows an example of the brake fluid pressure controller in this embodiment, and has the constitution called a "brake-by-wire". Specifically, for example, since this is described in Japanese Laid-Open Patent Publication No. 2000-62597, its operation will be explained briefly. A hydraulic circuit of a master cylinder MC and wheel cylinders Wfr, Wfl, Wrr, and Wrl is separated at the time of normal operation. A driver's braking request is detected by a brake pedal travel sensor SR, a tread force sensor, a master cylinder fluid pressure sensor, etc., a target braking force of each wheel is determined on the basis of the detected variables, and the braking hydraulic pressure of each wheel is controlled by each of linear solenoid valves (SL1 to SL8).

At the time of braking, ON/OFF types of solenoid valves SLa, SLb, and SLc are excited, and the solenoid valve SLa moves to an open position and the solenoid valves SLb and SLc moved to closed positions. Thus, the master cylinder MC is separated from the wheel cylinders Wfr, Wfl, Wrr, and Wrl, and communicates with a stroke simulator SM through the solenoid valve SLa. The braking force of each wheel is independently controlled by controlling a linear solenoid valve (for example, SL1) in an accumulator side, and a linear solenoid valve (for example, SL2) in a reservoir side by making a high-pressure accumulator ACC a pressure source.

In addition, the hydraulic circuit constitution in FIG. 5 is an example, and the present invention is not limited to this, but the constitution is sufficient only that the constitution is a hydraulic circuit constitution where each wheel cylinder can be automatically pressurized. The braking force-generating means may be a constitution (not shown) of giving the braking torque mechanically by a motor etc. without using brake fluid pressure.

(6) Control Block

Figure 2:
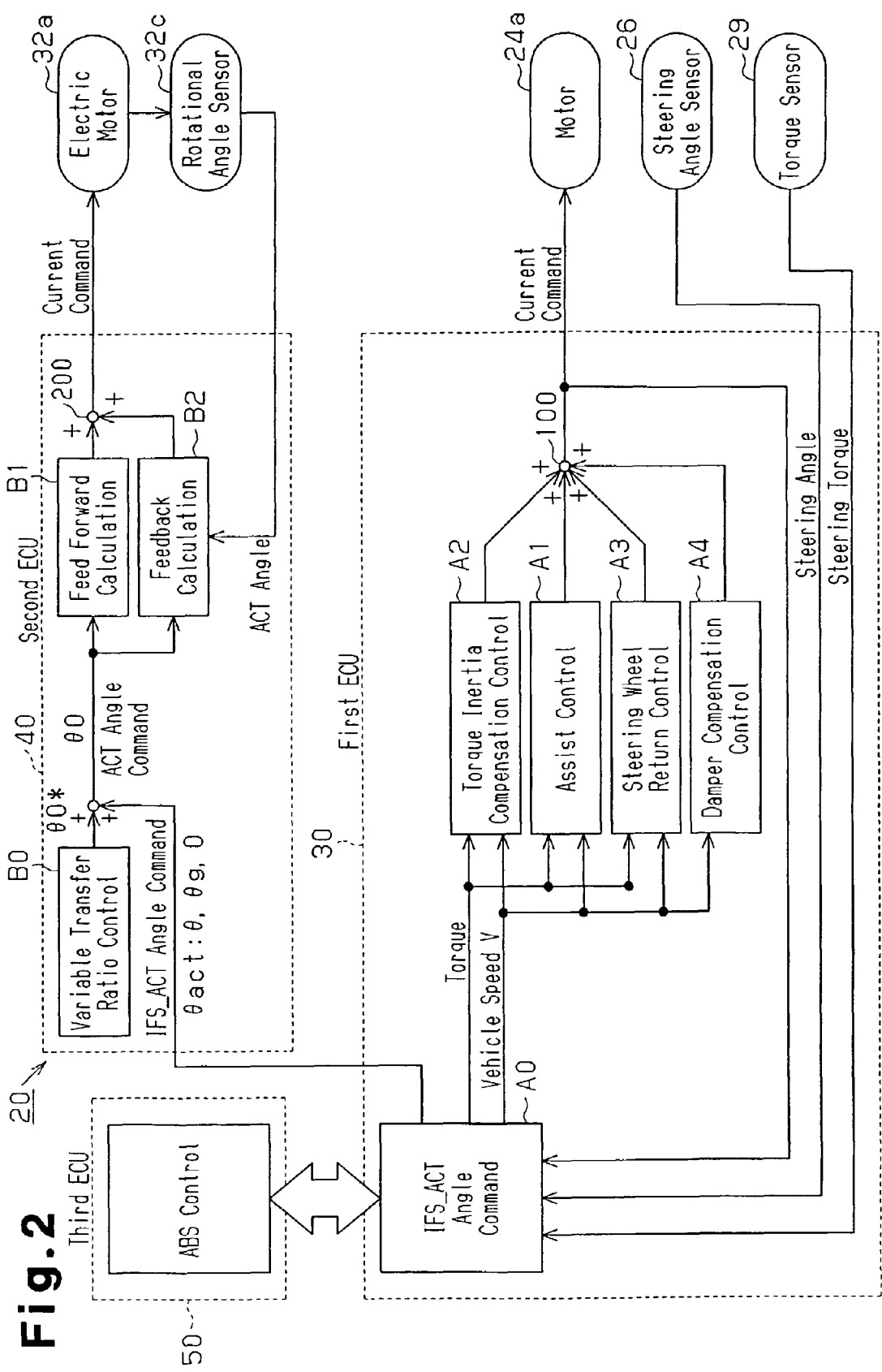
FIG. 2 is a control block diagram of the steering device 20 of the first embodiment.

Next, with reference to FIG. 2, control blocks of the first ECU 30 and the second ECU 40 will be explained. In FIG. 2, the control blocks of the steering device 20 are shown.

(6-1) Control Blocks of First ECU 30

In FIG. 2, IFS control described later is performed in a block A0 of the first ECU 30, and IFS_ACT angle command value θact is calculated. Moreover, on the basis of the steering torque and vehicle speed signal, well-known assist control, torque inertia compensation control, steering wheel return control, and damper compensation control calculation are executed in blocks A1 to A4, an assist current command value, a torque inertia compensating current command value, a steering wheel return current command value, and a damper compensation current command value are determined respectively.

The torque assistance which reduces an operating force of the steering wheel 21 applied by a driver is performed with the assist current command value which the block A1 calculates. Control which compensates for the response delay due to the inertia of the motor 24a with the torque inertia compensating current command value which the block A2 calculates is performed. Control is performed with the steering wheel return current command value, which the block A3 calculates, so that the return to the neutral position of the steering wheel 21 may be improved. Control is performed with the damper compensation current command value which the block A4 calculates so that the converging property may be improved by suppressing the excessive return of the steering wheel 21. Respective current command values calculated in respective blocks A1 to A4 are added in an adder 100, it becomes an EPS current command value, this EPS current command value is inputted into the motor drive circuit AC1 (refer to FIG. 4), and the motor 24a is controlled.

(6-2) Control Blocks of Second ECU 40

In FIG. 2, a block B0 of the second ECU 40 determines an ACT angle command value θ0* corresponding to the target rotation angle of the electric motor 32a determined by variable transfer ratio control processing in correspondence to the steering angle and vehicle speed V from the vehicle speed versus steering gear ratio map.

The block B1 inputs a value obtained by adding the IFS_ACT angle command value θact inputted from the block A0 of the first ECU 30 to the ACT angle command value θ0* as a new ACT angle command value θ0, performs feed forward calculation on the basis of this ACT angle command value θ0, and calculates a feed forward current command value. On the other hand, a block B2 calculates a feedback current command value by performing feedback calculation on the basis of the ACT angle command value θ0. Thus, a rotation angle of the electric motor 32a is detected by the rotational angle sensor 32c provided in the electric motor 32a, and is outputted to the second ECU 40 as an ACT angle signal. Therefore, a closed loop is constituted by the block B2, the electric motor 32a, and the rotational angle sensor 32c, which makes the feedback control of the electric motor 32a by the block B2 possible.

An adder 200 adds the feed forward current command value to the feedback current command value, its sum is inputted into the motor drive circuit AC2 (refer to FIG. 4), and, thereby, the electric motor 32a is controlled.

(6-3) Control Blocks of IFS Control Calculation

Next, with reference to FIG. 3, the control block of IFS control calculation which the first ECU 30 performs will be explained.

(Block C)

A block C is an estimation block of the difference between right and left braking forces which estimates a braking force given to each wheel of a vehicle, and estimates (calculates) the difference between braking forces given to the right and left wheels on the basis of the estimated braking forces. In addition, the difference between right and left braking forces is the difference between braking forces, given to wheels in a left-hand side of a vehicle, and braking forces, given to wheels in a right-hand side. The sum of the braking forces given to front and rear wheels in the left-hand side or the braking force given to a front wheel in the left-hand side is used as the former. In addition, the sum of the braking forces given to front and rear wheels in the right-hand side, or a braking force given to the front wheel in the right-hand side is used as the latter. In addition, in a description and drawings, the difference between right and left braking forces may be simply referred to as braking force difference for convenience of explanation.

In the block C, for example, with detection signals of fluid pressure sensor PS and the wheel speed sensor WS, which are provided in each wheel, specifically, with a brake fluid pressure (that is, braking hydraulic pressure) signal and a wheel speed signal, the braking force generated in each wheel is estimated, and the braking force difference between right and left wheels is calculated. In addition, since specific means relating to the estimation of a braking force is described in, for example, Japanese Laid-Open Patent Publication No. 2000-108863, explanation is omitted.

(Block D1)

A block D1 is a block of vehicle state quantity estimation (calculation), and obtains a target yaw rate γt and a target slip angle St on the basis of the vehicle speed V and the actual steered angle. The actual steered angle is calculated by the first ECU 30 on the basis of the output angle signal which is detected and outputted by the output angle sensor 28. In addition, since specific calculation methods of the target yaw rate γt of the vehicle and the target slip angle St of the vehicle are disclosed in Japanese Laid-Open Patent Publication No. 2002-254964, explanation is omitted.

In addition, the target yaw rate and the target slip angle are equivalent to the target vehicle state quantities.

(Block D2)

A block D2 is a block of yaw rate FB calculation and slip angle FB calculation. In the block D2, a proportional gain computing unit D2a, a differentiator D2b, a derivative gain computing unit D2c, and a gain computing unit D2d are provided. A deviation (hereinafter, this is referred to as a yaw rate deviation) between the target yaw rate γt, inputted from the block D1, and the actual yaw rate which is detected by the yaw rate sensor YS and is inputted through the third ECU 50, is inputted to the proportional gain computing unit D2a. Then, a controlled variable θp which is a proportional term of feedback control of the yaw rate is calculated by multiplying the yaw rate deviation by the yaw rate P gain. The controlled variable θp is outputted to an adder 70. In addition, the yaw rate which the yaw rate sensor YS detects is equivalent to the actual yaw rate.

The yaw rate deviation is differentiated in the differentiator D2b. The controlled variable θd which is a derivative term of feedback control of the yaw rate is calculated by multiplying the differentiated yaw rate deviation by the yaw rate D gain in the derivative gain computing unit D2c. The controlled variable θd is outputted to the adder 70. The sum of the controlled variable θp, which is the proportional of feedback control of the yaw rate, and the controlled variable θd, which is the derivative term, is equivalent to the yaw rate feedback term.

In the gain computing unit D2d, a slip angle deviation between the target slip angle St and the vehicle slip angle calculated by a well-known method by the third ECU 50 is inputted, the slip angle gain is multiplied by the slip angle deviation, and a controlled variable θs of the slip angle FB is calculated. The controlled variable θs is outputted to the adder 70.

(Block D3)

A block D3 is a block of yaw angle FB calculation, and comprises a block D3a and a block D3b. The block D3a is a block of target yaw angle calculation, and calculates a target yaw angle by integrating the target yaw rate γt. The block D3b is a block of yaw angle calculation, and calculates a yaw angle, that is, an actual yaw angle by integrating the yaw rate. In a gain D3c, the yaw angle gain is multiplied by the deviation between the target yaw angle and the yaw angle, a controlled variable θy of the yaw angle FB is calculated, and the controlled variable θy is outputted to the adder 70. The target yaw angle is equivalent to a target vehicle state quantity. The controlled variable θy of the yaw angle FB is equivalent to the yaw angle feedback term. In addition, the various kinds of gains are values determined on the basis of the structural characteristics of the vehicle and the steering device 20, and are obtained by test beforehand.

The adder 70 calculates the vehicle state quantities FB controlled variable θ by adding respective controlled variables inputted. Thus, θ=θp+θd+θy+θs is calculated and is outputted to a block I. The vehicle state quantity FB controlled variable θ is equivalent to the correction value.

(Block E)

Steering characteristics (US/OS) are calculated in a block E. Thus, in this embodiment, a front wheel slip angle and a rear wheel slip angle are calculated, the difference calculation between front wheel and the rear wheel slip angles and the time differentiation calculation of the slip angle difference are performed, and the judgment of oversteer (OS), understeer (US), or neutral steer (NS) is performed on the basis of these values. In addition, the detail of the steering characteristic (US/OS) calculation will be described later.

In addition, for the convenience of explanation, oversteer may be referred to as shortly OS, understeer may be US, and the neutral steer may be NS.

(Block F)

In a block F, the grip factor of a steered wheel is estimated on the basis of the yaw rate, lateral acceleration, the vehicle speed V, and the motor current. The estimation of the grip factor will be explained with reference to FIGS. 10 to 12.

Figure 10:
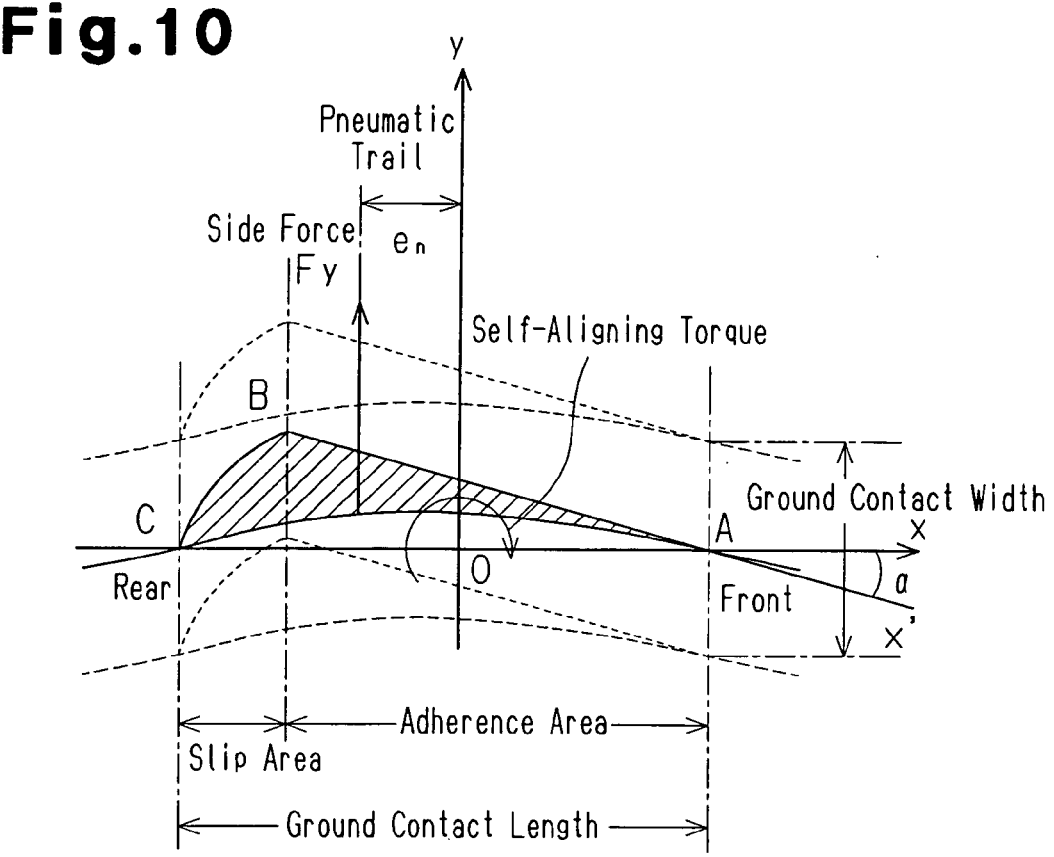
FIG. 10 is a graph showing a relationship between the self-aligning torque and the side force in a state of performing rolling motion in regard to a common vehicle with tires skidding.

First, in Automobile technical handbook, Vol. 1, foundation and theoretical edition (First edition, published by Society of Automotive Engineers of Japan on Dec. 1, 1990), p. 179–180, a state that a tire rolls with skidding at a skid angle α is explained as shown in FIG. 10. Thus, in FIG. 10, a tread surface of the tire shown by a dotted line contacts with a road surface in a front end of a ground plane including a point A in FIG. 10, adheres to a road surface up to a point B, and moves in a traveling direction of the tire. Then, the tire begins to slip at the point where a deforming force by crosswise shear deformation becomes equal to a frictional force, and separates from the road surface in a rear edge including a point C to return to the original state. At this time, a force (side force Fy) generated in the entire ground plane is represented by a product of a deforming area (hatched portion in FIG. 10) of a tread section in the crosswise direction, and a crosswise elastic constant of the tread section per unit area. As shown in FIG. 10, a point of application of force of the side force Fy exists by en (pneumatic trail) behind (a left-hand side in FIG. 10) a point (point O) just under a centerline of the tire. Accordingly, moment Fy·en at this time is self-aligning torque (Tsa), and acts in the direction of decreasing the skid angle α.

Next, the case that a vehicle is equipped with a tire will be explained by using FIG. 11 which is given by simplifying FIG. 10. In a steered wheel of the vehicle, in order to improve the return to a neutral position of a steering wheel, a castor angle is given to the tire, and usually, a castor trail ec is provided. Accordingly, a touch down point of the wheel is shifted from the point O to a point O', and the moment which is going to restore a steering wheel to a neutral position becomes Fy·(en+ec).

Figure 11:
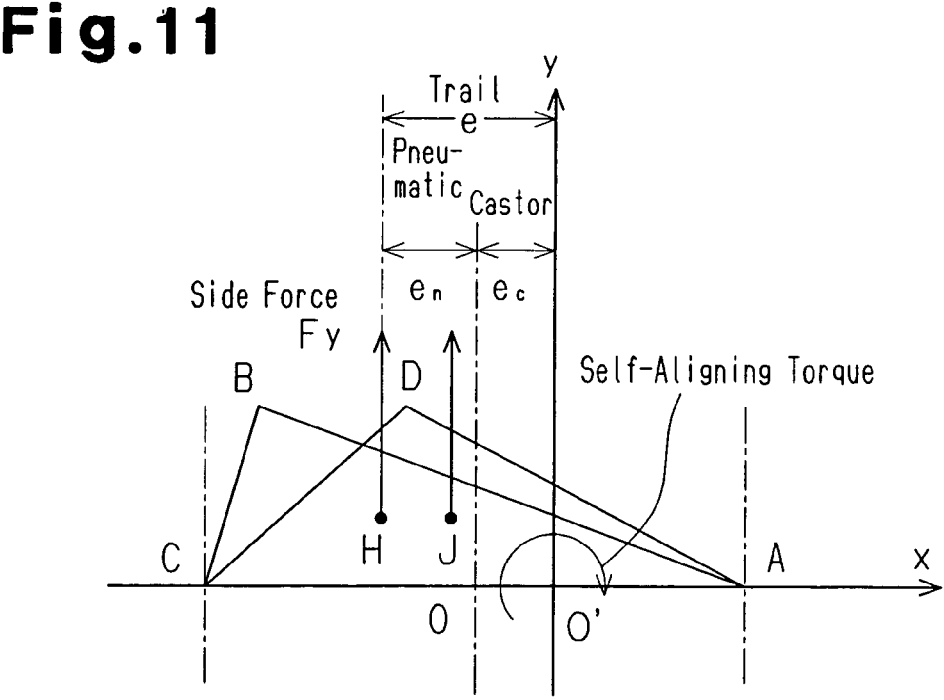
FIG. 11 is a graph simply showing a relationship between the self-aligning torque and the side force in FIG. 10.

When the lateral grip state of the tire drops and a slip area is expanded, the crosswise deforming of the tread section becomes a shape of ADC from the shape of ABC in FIG. 11. In consequence, the point of application of force of the side force Fy moves ahead (from a point H to a point J in FIG. 11) to a vehicle's traveling direction. That is, the pneumatic trail en becomes small. Accordingly, when an adherence area is large and a slip area is small (that is, when the horizontal grip of the tire is high) even if the same side force Fy is acting, the pneumatic trail en becomes large, and the self-aligning torque Tsa becomes large. On the contrary, when the lateral grip of the tire is lost and the slip area increases, the pneumatic trail en becomes small and the self-aligning torque Tsa decreases.

As described above, when an attention is paid to a change of the pneumatic trail en, it is possible to detect the extent of the lateral grip of the tire. Then, since the change of the pneumatic trail en emerges in the self-aligning torque Tsa, it is possible to estimate the grip factor showing the extent of a lateral grip to the wheel of a vehicle front on the basis of the self-aligning torque Tsa.

In addition, although a lateral force usage rate or a horizontal G usage rate is used for the control of a steering device in Japanese Laid-Open Patent Publication No. 11-99956, the grip factor is different from these as follows. In the device described in this publication, the maximum lateral force which can be generated from a road is obtained from a road surface friction coefficient $\mu$. This road surface friction coefficient $\mu$ is estimated on the basis of the road surface friction coefficient $\mu$ dependency of a cornering power Cp (a value of a side force per a slip angle of 1°). However, the cornering power Cp is influenced by not only the road surface friction coefficient $\mu$, but also a shape of a tire ground plane (length and width of a ground plane), the elasticity of tread rubber. For example, when water intervenes between a tread surface, or when the elasticity of tread rubber changes with tire wear or temperature, the cornering power Cp changes even when a road surface friction coefficient $\mu$ is the same. In this way, in the technology described in this publication, the characteristics of a wheel as a rubber tire are not considered at all.

Figure 12:
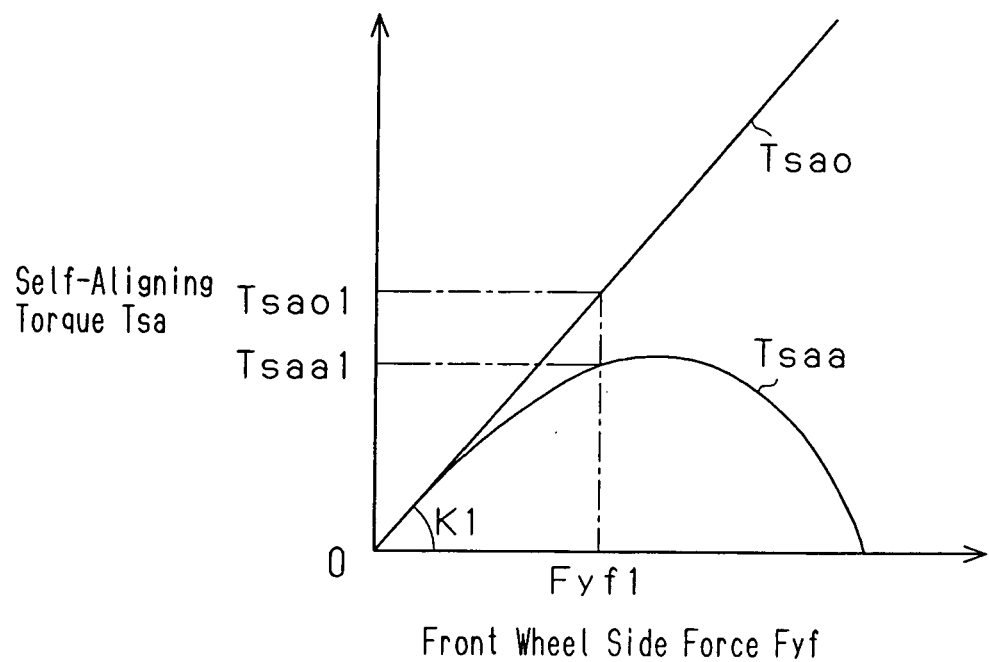
FIG. 12 is a graph showing characteristics of the self-aligning torque versus the front wheel side force.
Figure 13:
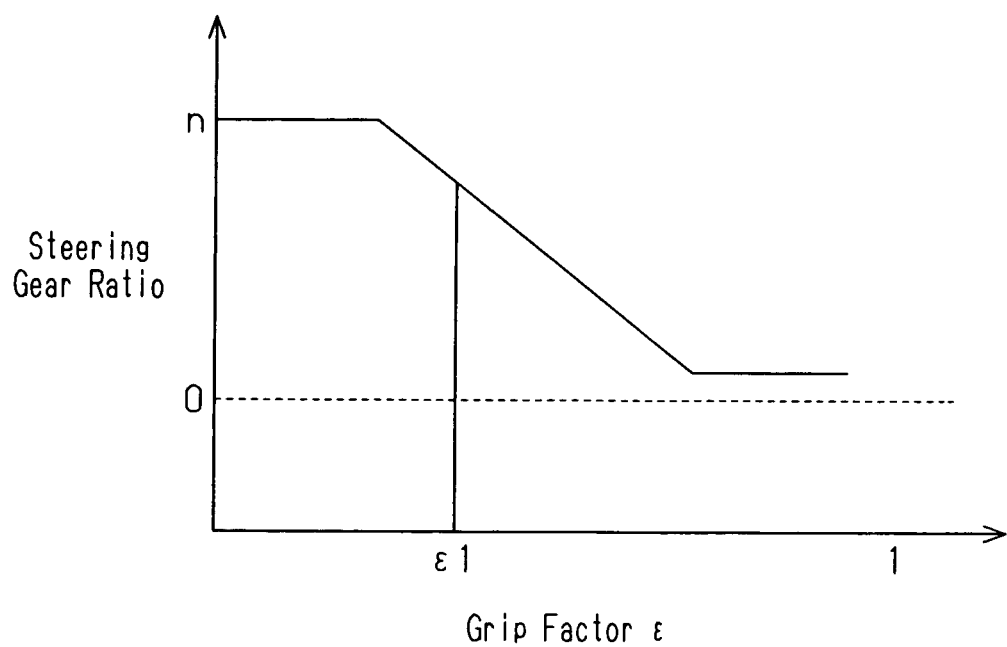
FIG. 13 is a graph showing a map for calculating the gear ratio to the grip factor $\epsilon$.

Clearly from FIGS. 10 and 11, the characteristics of the self-aligning torque versus the front wheel side force for a vehicle front wheel become ones as shown by Tsaa in FIG. 12. As mentioned above, letting the actual self-aligning torque be Tsaa, and letting the front wheel side force be Fyf, Tsaa=Fyf·(en+ec), and hence, the nonlinear characteristics of the actual self-aligning torque Tsaa versus the front wheel side force Fyf express the direct change of the pneumatic trail en. Accordingly, the gradient K1 of the actual self-aligning torque Tsaa to the front wheel side force Fyf near the origin 0 (the front wheels are in a grip state) is identified, that is, the characteristics shown by the self-aligning torque characteristics (reference self-aligning torque Tsao) in a full grip state are obtained. In addition, it is preferable to use a predetermined value that is experimentally calculated as an initial value of the gradient K1. Also, when the grip factor is high during normal driving, it is preferable to detect the grip factor and correct the gradient K1, accordingly. In addition, the actual self-aligning torque Tsaa is obtained by the calculation described later.

Then, the grip factor of the front wheels is estimated on the basis of the actual self-aligning torque Tsaa to the reference self-aligning torque Tsao. For example, it is possible to express the grip factor $\epsilon$ using the equation $\epsilon$=Tsaa1/Tsao1 on the basis of a value Tsao1 (Tsao1=K1·Fyf1) of the reference self-aligning torque Tsao in the case that a front wheel side force is Fyf1, and a value Tsaa1 of the actual self-aligning torque Tsaa.

Figure 14:
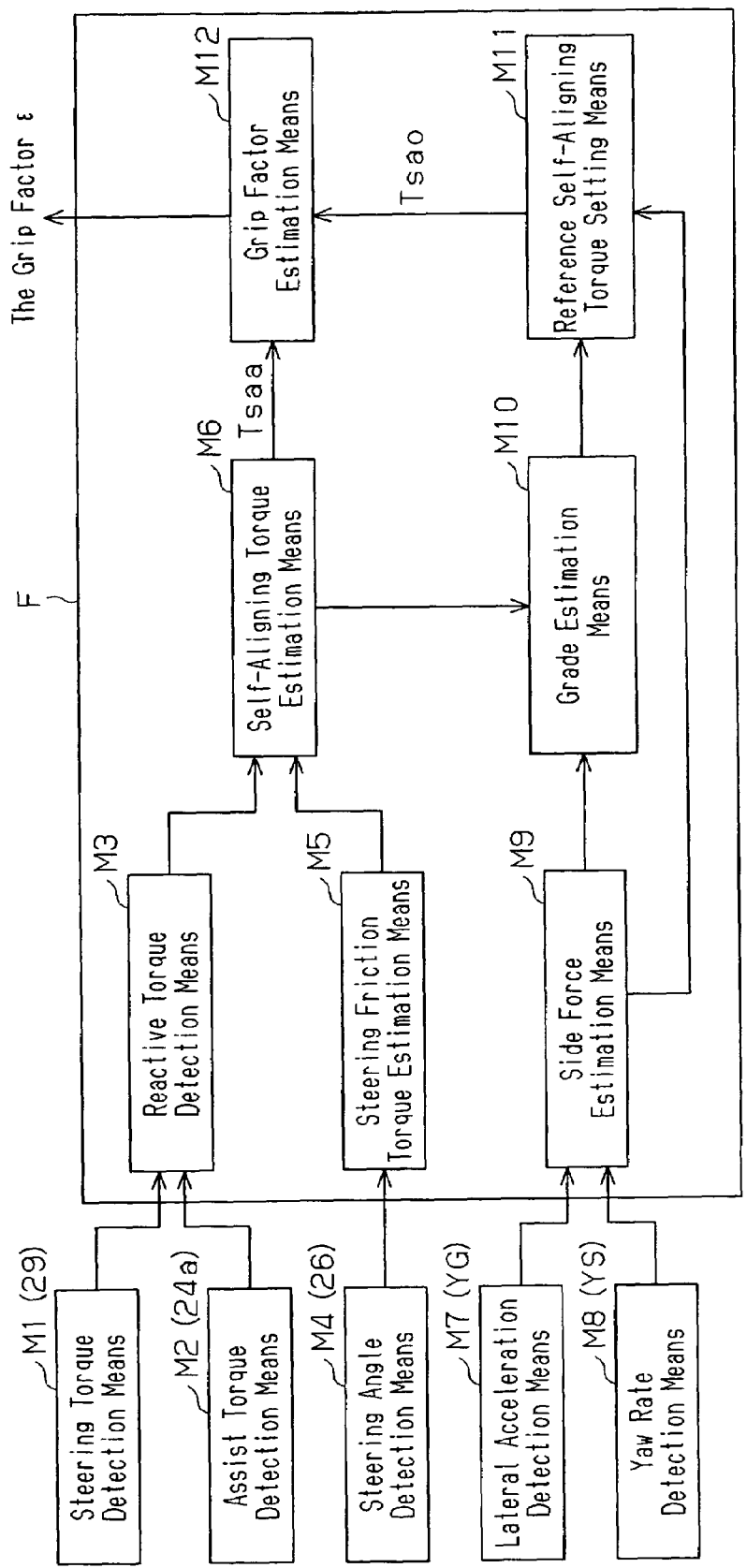
FIG. 14 is a control block diagram of a block F.

As mentioned above, although the grip factor of a wheel can be estimated on the basis of a change of the self-aligning torque (actual self-aligning torque Tsaa) to the side force (front wheel side force Fyf), this is realizable with the constitution shown in FIG. 14.

First, in FIG. 14, steering torque detection means M1 and assist torque detection means M2 are provided as steering force index detection means to detect at least one steering force index (for example, steering torque) in the steering force indices containing the steering torque and steering force which are applied to a steering system from a steering wheel (not shown) of a vehicle to a suspension (not shown). On the basis of these detection results, reactive torque is detected by the reactive torque detection means M3. The reactive torque is equivalent to the torque which a tire receives from a road surface.

In this embodiment, for example, the steering torque sensor 29 shown in FIG. 1 is equivalent to the steering torque detection means M1. Moreover, the assist torque is obtained from the motor current of the motor 24a, and the current sensor 24b is equivalent to the assist torque detection means M2. Moreover, the steering angle sensor 26 is equivalent to the steering angle detection means M4 in FIG. 14, and the steering friction torque is estimated by the steering friction torque estimation means M5. This will be described later.

On the basis of the detection results of the reactive torque detection means M3 and the steering friction torque estimation means M5, the actual self-aligning torque Tsaa generated in the steered wheels FR and FL in the vehicle front is estimated by the self-aligning torque estimation means M6.

In this embodiment, lateral acceleration detection means M7 and yaw rate detection means M8 are provided as vehicle state quantity detection means to detect the state quantities of the vehicle. The lateral acceleration sensor YG is equivalent to the lateral acceleration detection means M7, and the yaw rate sensor YS is equivalent to the yaw rate detection means M8. On the basis of these detection signals, at least one front wheel index in the front wheel indices which include the side force and front wheel slip angle for the steered wheels FR and FL in the vehicle front (the front wheel side force Fyf in FIG. 14) is estimated by side force estimation means M9 which is the front wheel index estimation means.

The front wheel side force Fyf is estimated according to a formula, Fyf=(Lr·m·Gy+Iz·dγ/dt)/L on the basis of output results of the lateral acceleration detection means M7 and the yaw rate detection means M8. Here, Lr denotes a distance from a center of gravity to a rear wheel shaft, m denotes vehicle mass, L denotes a wheelbase, Iz denotes yaw moment of inertia, Gy denotes lateral acceleration, and dγ/dt denotes a time differentiation value of a yaw rate.

Moreover, reference self-aligning torque is set in reference self-aligning torque setting means M11 on the basis of the actual self-aligning torque Tsaa estimated by the self-aligning torque estimation means M6, and the front wheel side force Fyf estimated by the side force estimation means M9. For example, a gradient of the self-aligning torque near the origin is estimated by gradient estimation means M10, and reference self-aligning torque is set in the reference self-aligning torque setting means M11 on the basis of this gradient and the front wheel side force. Then, on the basis of the comparison result of the reference self-aligning torque set in the reference self-aligning torque setting means M11, and the self-aligning torque estimated by the self-aligning torque estimation means M6, the grip factor ϵ for the front wheels is estimated in grip factor estimation means M12.

Thus, in FIG. 14, self-aligning torque gradient K1 near the origin in FIG. 12 is obtained on the basis of the actual self-aligning torque Tsaa estimated by the self-aligning torque estimation means M6, and the front wheel side force Fyf estimated by the side force estimation means M9. The reference self-aligning torque Tsao is obtained by the following formula, Tsao=K1·Fyf on the basis of this gradient K1 and the front wheel side force Fyf, and is compared with the actual self-aligning torque Tsaa. On the basis of this comparison result, the grip factor ϵ is obtained by the following formula: ϵ=Tsaa/Tsao.

As described above, since the drive current of the motor 24a is proportional to the assist torque in this embodiment, it is possible to estimate the reactive torque easily on the basis of this assist torque and the detection result of the steering torque detection means M1. Moreover, although it is necessary to compensate for the torque by friction of the steering system, the steering friction torque estimation means M5 calculates the difference between the maximum value of the reactive torque at the time of quickly turning the steering wheel, and the reactive torque at the time of returning the steering wheel as the friction torque, and corrects the friction torque serially. For this reason, it is possible to adequately estimate the self-aligning torque (actual self-aligning torque Tsaa). Nevertheless, the present invention is not limited to this, but it is also possible to measure the self-aligning torque from a detection signal by mounting, for example, a load cell on a steering shaft (not shown), or providing a strain gauge in a suspension member.

(Block G)

Figure 3:
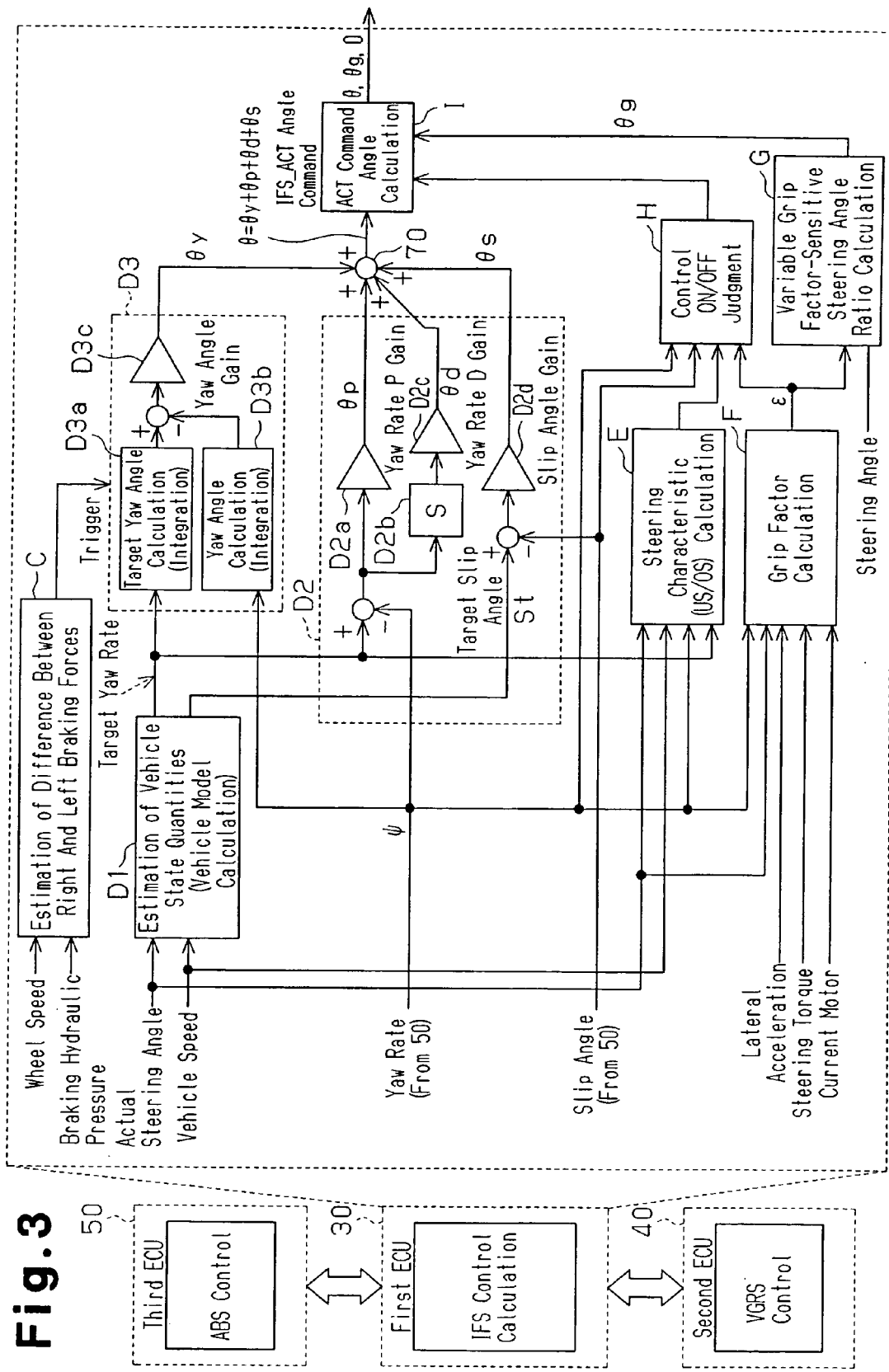
FIG. 3 is a control block diagram of a first ECU 30 similarly.

In a block G shown in FIG. 3, a calculation for the varying steering angle ratio in response to the grip factor is performed. When the grip factor ϵ is inputted from the block F, in the block G, a steering gear ratio of the IFS actuator 32 is determined on the basis of the inputted grip factor ϵ from the grip factor versus steering gear ratio map (refer to FIG. 13).

This grip factor versus steering gear ratio map is designed so that a steering gear ratio becomes large as the grip factor becomes small near a middle portion of the degree, and that the steering gear ratio becomes small as the grip factor ϵ becomes large. Moreover, on this map, the correspondence of both indices is mapped respectively so that the steering gear ratio may become fixed at the maximum value near the lower limit region of the grip factor, and that the steering gear ratio may become fixed at the minimum value near the upper limit region. That is, the correspondence is mapped so that, when a grip state of a steered wheel approaches the grip limitation, that is, when the grip state approaches a state just before the steered wheel begins to slip on a ground plane by the grip factor becoming equal to or less than a threshold value, the steering gear ratio may increase.

Then, the correction steered angle θg is calculated. This correction steered angle θg is calculated by multiplying the determined steering gear ratio by the steering angle detected by the steering angle sensor 26. The correction steered angle θg is equivalent to the grip factor-sensitive controlled variable.

In this embodiment, it is set that a second US start threshold value ϵ1 described later includes the full area where the steering gear ratio becomes fixed at the maximum value.

In this case, it is set that, as the grip factor ϵ becomes small, the steering gear ratio becomes large and the correction steered angle θg becomes small. In addition, it is set that the correction steered angle θg becomes fixed at the minimum value near the lower limit region of the grip factor ϵ. For this reason, in the IFS actuator 32, the transfer ratio becomes large as the grip factor ϵ becomes small. In this way, since the steering gear ratio of the IFS actuator 32 is set to be large, the steered wheels are turned small even if the steering angle by the steering wheel 21 is large, and hence, it is possible to keep the stability of vehicle behavior.

(Block H)

Control ON/OFF judgment calculation is performed in a block H. Thus, in this block H, the ON/OFF judgment of the IFS control is performed on the basis of a vehicle state, that is, the calculation result of steering characteristics (US/OS), yaw rate, and grip factor. In addition, details will be described later.

(Block I)

ACT command angle calculation is performed in a block I. Thus, according to the judgment result in the block H, IFS control is switched, and according to this switching, an IFS_ACT angle command value θact is outputted to the second ECU 40. Details will be described later.

(7) Operation of the First Embodiment

Figure 6:
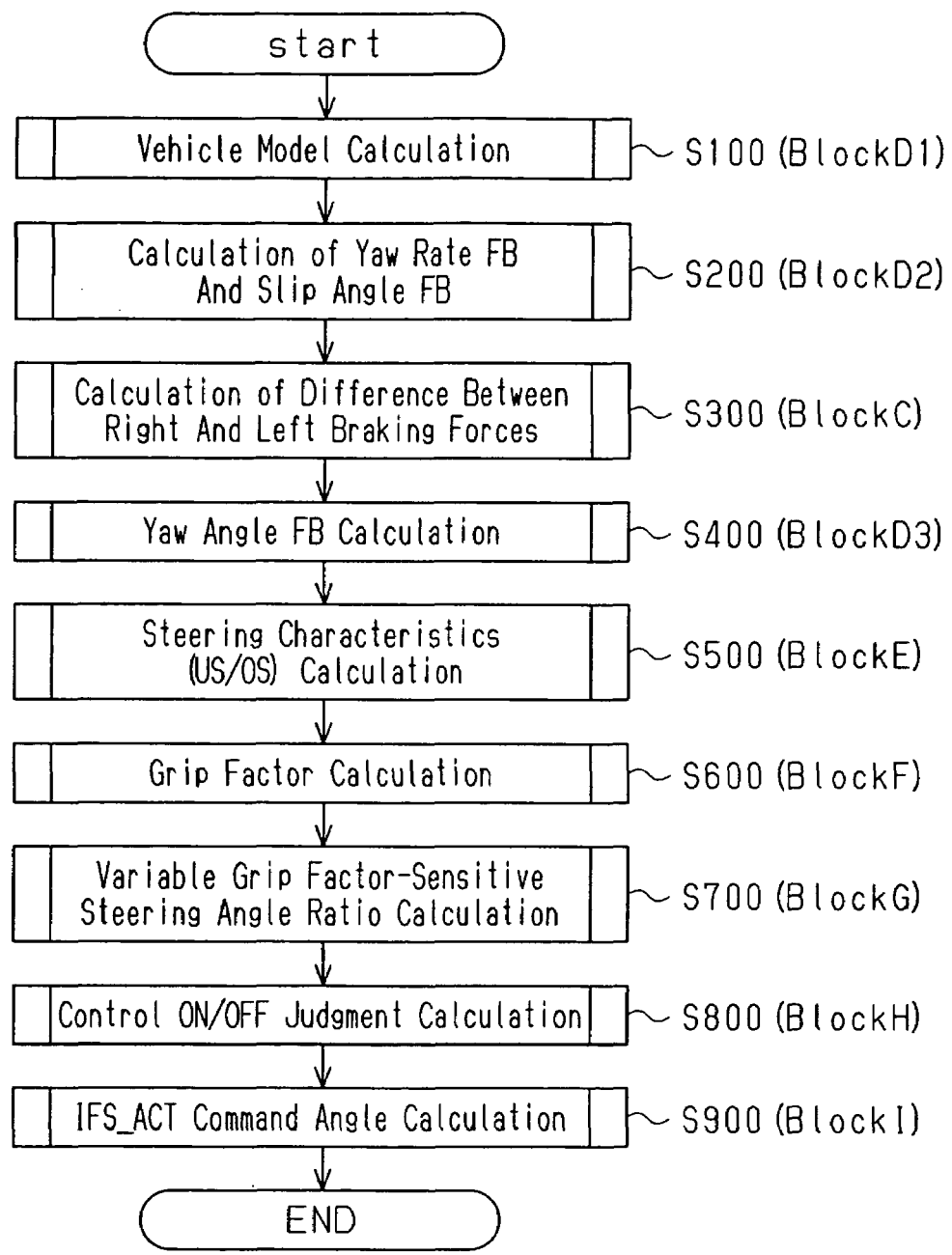
FIG. 6 is a flowchart of an IFS control calculation program which an IFSCPU of a first ECU 30 of the steering device 20 executes.

Now, the operation of the steering device 20 constituted as mentioned above will be explained with reference to FIGS. 6 to 12. FIG. 6 is a flowchart of an IFS control calculation program, which is executed by a CPU (IFSCPU) of the first ECU 30 at a predetermined cycle.

(S100: Vehicle Model Calculation: Block D1)

At S100, a vehicle model calculation is performed on the basis of the vehicle speed V and the actual steering angle, and obtains the target yaw rate γt and the target slip angle St.

(S200: Yaw Rate FB Calculation and Slip Angle FB Calculation: Block D2)

At S200, yaw rate FB calculation and slip angle FB calculation are performed. In the yaw rate FB calculation, the controlled variable θp and the controlled variable θd of the yaw rate FB are obtained on the basis of the target yaw rate γt and the actual yaw rate. Moreover, in the slip angle FB calculation, the controlled variable θs of the slip angle FB is obtained on the basis of the target slip angle St and the actual slip angle.

(S300: Calculation of Difference Between Right and Left Braking Forces: Block C)

At S300, the calculation of the difference between right and left braking forces is performed. Thus, with detection signals (specifically, a brake fluid pressure signal and a wheel speed signal) of the fluid pressure sensor PS and the wheel speed sensor WS, which are provided in each wheel, the braking force generated in each wheel is estimated, and the braking force difference between right and left wheels is calculated.

(S400: Yaw Angle FB Calculation: Block D3)

Yaw angle FB calculation is performed at S400. Thus, on the basis of the target yaw rate γt and the actual yaw rate, the controlled variable θy of the yaw angle FB is obtained.

(S500: Steering Characteristic (US/OS) Calculation: Block E)

Figure 7:
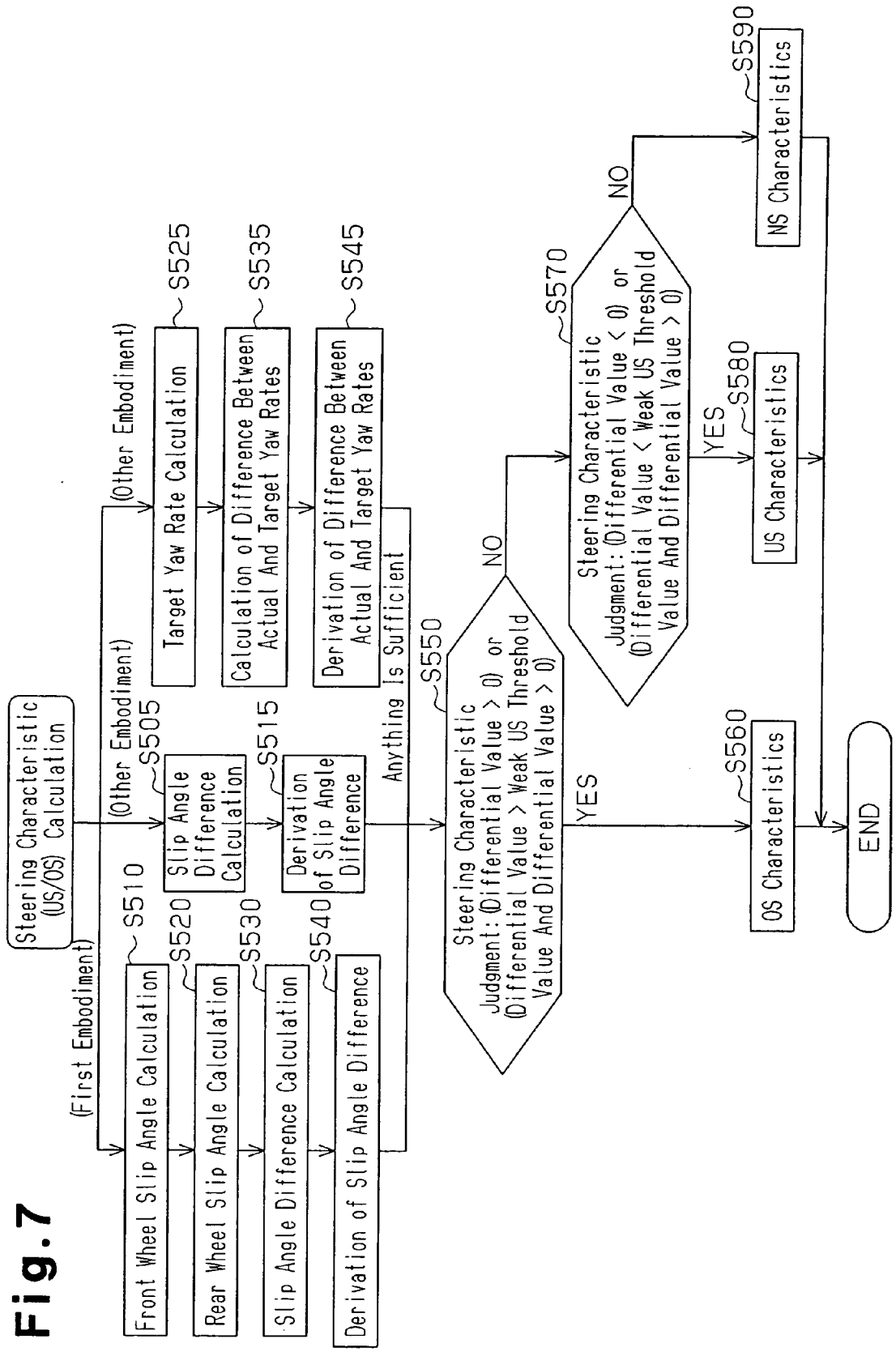
FIG. 7 is a flowchart of steering characteristic (US/OS) calculation.

Steering characteristic (US/OS) calculation is performed at S500. FIG. 7 is a flowchart of steering characteristic (US/OS) calculation, and S510 to S590 are executed in this embodiment. Front wheel slip angle calculation is performed at S510 with the following formula $$\beta f = \beta(n-1) + (Lf \cdot \psi)/V - \delta f \quad (1)$$

In addition, $\beta f$ denotes a front wheel slip angle, $\beta(n-1)$ denotes a previous vehicle slip angle, Lf denotes a distance between a front axle and a center of gravity of a vehicle, $\psi$ denotes a yaw rate, V denotes vehicle speed, and $\delta f$ denotes a steered angle (front wheel).

Rear wheel slip angle calculation is performed at S520 with the following formula (2):

$$\beta r = \beta(n-1) + (Lf \cdot \psi)/V \quad (2)$$

In addition, $\beta r$ denotes a rear wheel slip angle.

A differential value is calculated by performing the difference calculation of the front wheel slip angle and the rear wheel slip angle at S530, and a derivation of difference is obtained at S540 by the time derivation of the slip angle difference. Then, the steering characteristic is judged at S550. In this embodiment, when the following judgment requirement A is satisfied, it is judged that the vehicle state is oversteer.

(Judgment Requirement A)
(Differential value>0) or (Differential value>weak US threshold value and derivation of difference>0)

Thus, the judgment of oversteer may be performed when the inequality differential value>0 is satisfied, or may be also performed when the inequality differential value>weak US threshold value, and the inequality derivation of difference>0 are satisfied. In addition, the weak US threshold value is a threshold value determined beforehand. The weak US threshold value is equivalent to the magnitude of a differential value generated at the time of an understeer tendency that the stability of a vehicle deteriorates a little although a driver does not sense a danger when he/she rapidly turns or returns the steering wheel on a high u road, and is a value obtained by test etc.

When it is judged at S550 that the state is oversteer, an OS characteristic flag which shows the judged result that the vehicle state is oversteer is set at S560. If the judgment requirement A is not satisfied at S550, the steering characteristic, it is judged at S570 whether it is understeer. In this embodiment, when the following judgment requirement B is satisfied, it is judged that the vehicle state is understeer.

(Judgment Requirement B)
(Differential value<0) or (Differential value<weak OS threshold value and derivation of difference>0)

Thus, the judgment of understeer may be performed when the inequality differential value<0 is satisfied, or the judgment may be performed when the inequality differential value<weak OS threshold value and the inequality derivation of difference>0 are satisfied. In addition, the weak OS threshold value is a threshold value determined beforehand. The weak OS threshold value is equivalent to the magnitude of a differential value generated at the time of an oversteer tendency that the stability of a vehicle deteriorates a little at the time of returning the steering wheel although a driver does not sense a danger when he/she rapidly turns or returns the steering wheel on a high $\mu$ road, or when largely circling the vehicle at low speed at the time of a U-turn or the like, and is a value obtained by test etc.

When it is judged at S570 that the state is understeer, an US characteristic flag which shows the judged result that the vehicle state is understeer is set at S580. If the judgment requirement B is not satisfied at S570, an NS characteristic flag which shows that the vehicle state is not oversteer and not understeer is set at S590.

(S600: Grip Factor Calculation: Block F)

Grip factor calculation is performed at S600, and as explained in the block F, the grip factor $\epsilon$ is calculated.

(S700: Calculation for Varying Steering Angle Ratio in Response to Grip factor: Block G)

A calculation for the varying steering angle ratio in response to the grip factor is performed at S700. As explained in the block G, the correction steered angle $\theta g$ is calculated.

(S800: Control ON/OFF Judgment Calculation: Block H)

Figure 8:
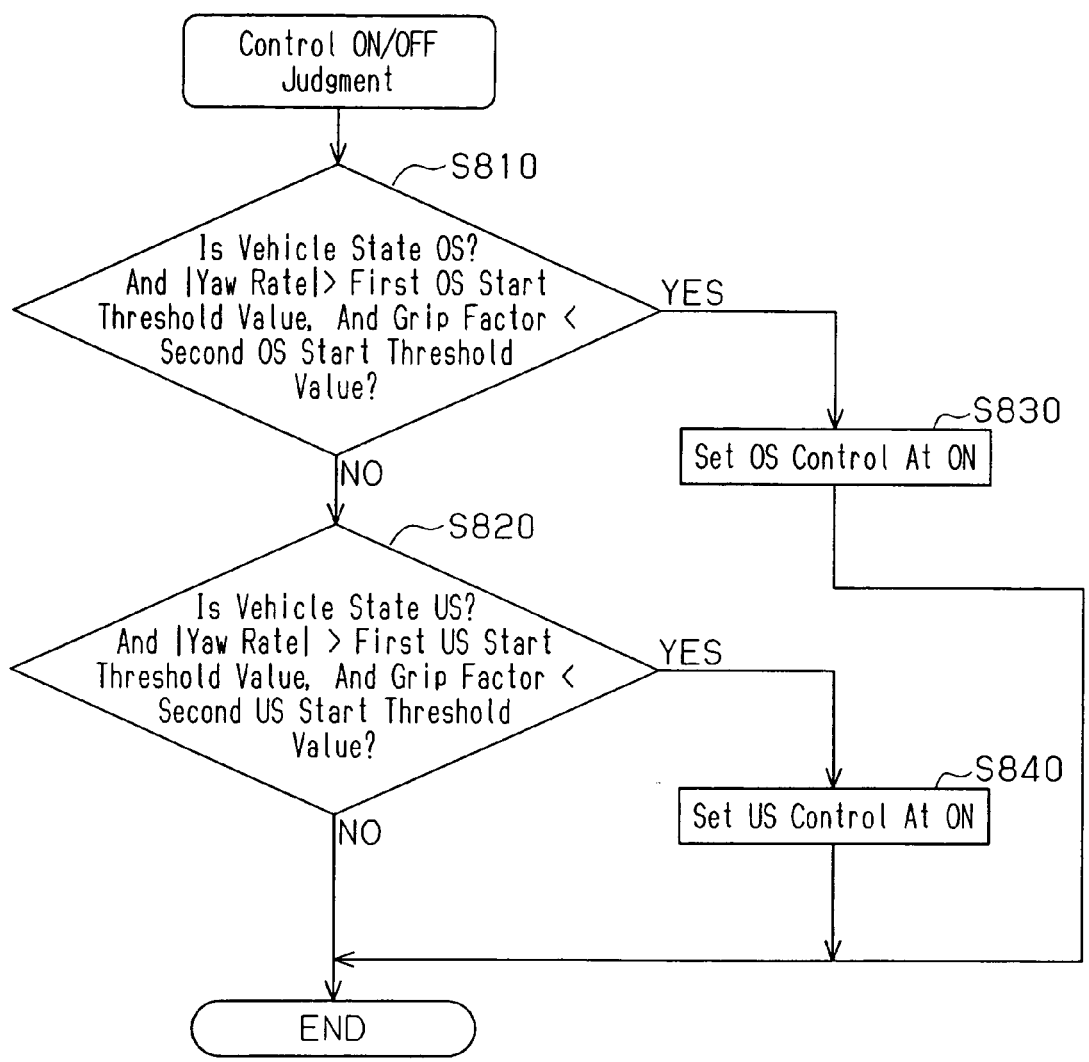
FIG. 8 is a flowchart of control ON/OFF judgment control.

Control ON/OFF judgment calculation is performed at S800. FIG. 8 is a flowchart of control ON/OFF judgment calculation. It is judged at S810 whether the following judgment requirement C is satisfied. When the judgment requirement C is satisfied, an oversteer control flag is set at S830.

(Judgment Requirement C)
Vehicle state=oversteer, |yaw rate $\psi$|>first OS start threshold value, and the grip factor $\epsilon$<second OS start threshold value Whether the vehicle state is oversteer is judged based on whether the OS characteristic flag is set at S500. In addition, the first OS start threshold value is a judgment threshold value for judging whether the magnitude of the yaw rate $\psi$ reaches the magnitude at the time of oversteer, and is equivalent to the conventional control start threshold value described in the description of the related art. The second OS start threshold value is a judgment threshold value for judging whether the grip factor $\epsilon$ reaches the grip factor at the time of oversteer. Both judgment threshold values are values obtained by test beforehand. The second OS start threshold value is equivalent to the first predetermined threshold value of the present invention.

The second OS start threshold value is for judging whether processing at S830 is performed. That is, even if the vehicle state is oversteer and the inequality |yaw rate $\psi$|>first OS start threshold value is satisfied, the degrees of grip $\epsilon$ is judged to be sufficient when the grip factor $\epsilon$ is equal to or more than the second OS start threshold value. In this case, the processing at S830 is not executed.

When the judgment requirement C is not satisfied at S810, the process shifts to S820. It is judged at S820 whether the following judgment requirement D is satisfied. When the judgment requirement D is satisfied, an understeer control flag is set at S840.

(Judgment Requirement D)
Vehicle state=understeer, |yaw rate $\psi$|>first US start threshold value, and grip factor $\epsilon$<second US start threshold value $\epsilon 1$ Whether the vehicle state is understeer is judged based on whether the US characteristic flag is set at S500.

The first US start threshold value is a judgment threshold value for judging whether the yaw rate $\psi$ is a yaw rate at the time of understeer. The second US start threshold value $\epsilon 1$ is a judgment threshold value for judging whether the grip factor $\epsilon$ reaches the grip factor at the time of understeer. Both judgment threshold values are values obtained by test etc. beforehand. The second US start threshold value corresponds to the second predetermined threshold value of the present invention.

The second US start threshold value ∈1 is for judging whether processing at S840 is performed. That is, even if the vehicle state is understeer and the inequality |yaw rate ψ|>first US start threshold value is satisfied, the degrees of grip ∈ is judged to be sufficient when the grip factor ∈ is equal to or more than the second US start threshold value ∈1. In this case, the processing at S840 is not executed.

(S900: Active Counter Steering ACT Command Angle Calculation: Block I)

Figure 9:
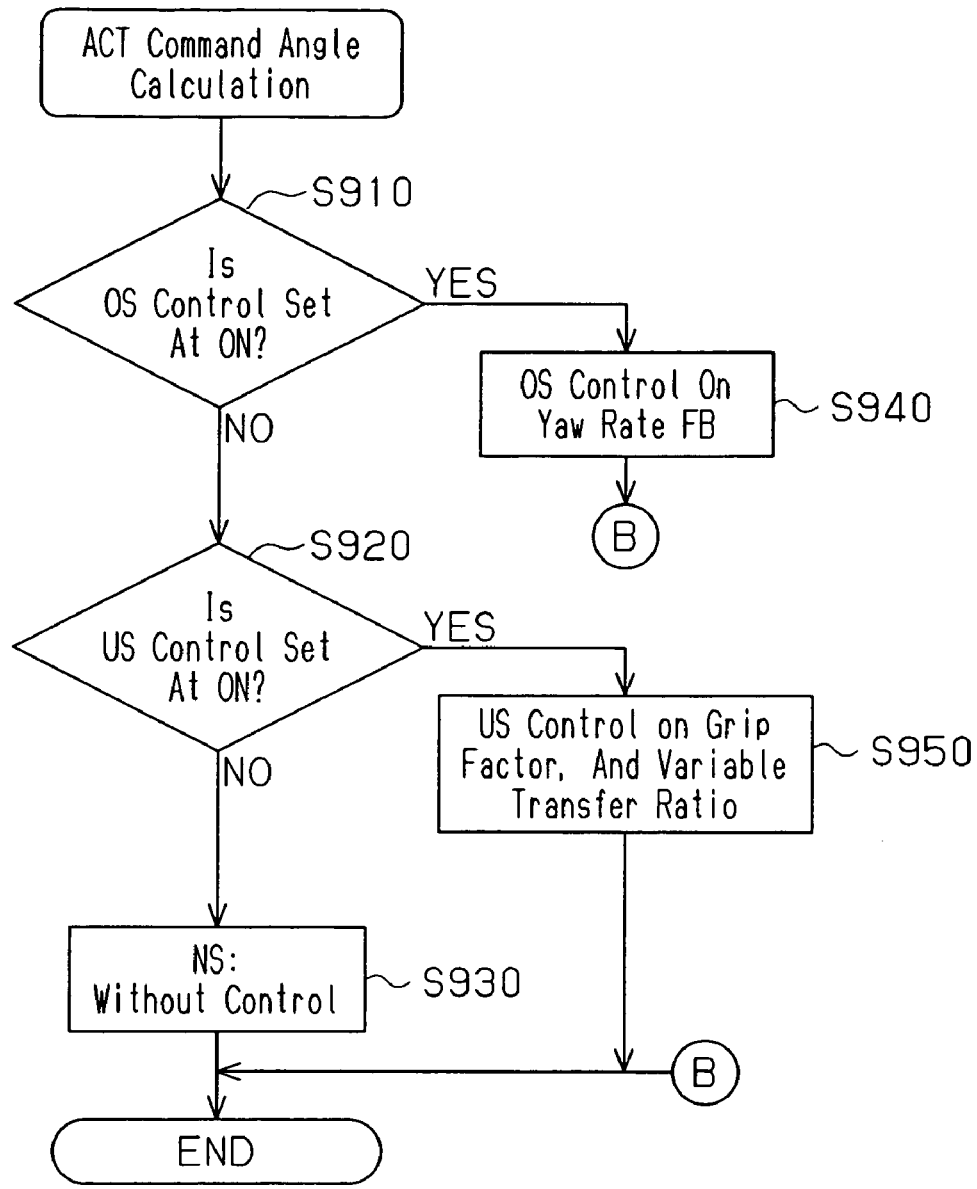
FIG. 9 is a flowchart of active counter steering ACT command angle calculation.

Active counter steering ACT command angle calculation is performed at S900. FIG. 9 is a flowchart of the active counter steering ACT command angle calculation.

It is judged at S910 whether the OS control is ON. Specifically, whether the OS control is ON is judged based on whether the oversteer control flag is set at S800. When the oversteer control flag is set, the vehicle state quantity FB controlled-variable θ is outputted to the second ECU 40 as the IFS_ACT angle command value θact at S940. The transfer ratio of the IFS actuator 32 is also determined by this vehicle state quantity FB controlled-variable θ.

Moreover, when the oversteer control flag is not set at S910, it is judged at S920 whether the US control is ON. Specifically, whether the US control is ON is judged based on whether the understeer control flag is set at S840. When the understeer control flag is set, the correction steered angle θg is outputted to the second ECU 40 as the IFS_ACT angle command value θact at S950.

In addition, when the understeer control flag is not set at S920, the block I outputs a value of "0" to the second ECU 40 as the IFS_ACT angle command value θact at S930. Thus, the second ECU 40 makes a value, obtained by adding the ACT angle command value θ0* to the IFS_ACT angle command value θact, a new ACT angle command value θ0, and controls the electric motor 32a on the basis of this ACT angle command value θ0.

(Processing in Oversteer Tendency)

There is a case that the stability of the vehicle deteriorates a little although a driver does not sense a danger when he/she rapidly turns or returns the steering wheel on a high μ road during vehicle driving. At this time, the state becomes in an oversteer tendency when the steering wheel is returned.

In the control ON/OFF judgment calculation at S800, the device 20 of this embodiment judges that the degrees of grip ∈ is sufficient when the grip factor ∈ is equal to or more than the second OS start threshold value even if the vehicle state is oversteer and the inequality |yaw rate ψ|>first OS start threshold value is satisfied. In this case, the device 20 does not execute the processing at S830. Thus, in the control ON/OFF judgment calculation at S800 which is shown in FIG. 8, since the judgment at S810 is determined to be "NO" and the vehicle state is oversteer, the judgment at S820 is also "NO". Accordingly, in the active counter steering ACT command angle calculation at S900 which is shown in FIG. 9, since the judgment is determined to be "NO" at S910 and S920, the value of "0" is outputted to the second ECU 40 as the IFS_ACT angle command value θact at S930.

As a result, the electric motor 32a of the IFS actuator 32 is controlled by the second ECU 40 with the ACT angle command value θ0* corresponding to the target rotation angle of the electric motor 32a of the IFS actuator 32 uniquely determined corresponding to the steering angle and the vehicle speed V with variable transfer ratio control processing. Thus, the unnecessary counter steering is not performed.

In addition, similarly, when the vehicle is largely circled at low speed at the time of a U-turn or the like, the steering characteristic becomes an oversteer tendency when the steering wheel is returned, and an absolute value of the yaw rate ψ may exceed the first OS start threshold value at S810. However, also in this case, since the processing at S830 is not executed because it is judged that the grip factor ∈ is sufficient when the grip factor ∈ is equal to or more than the second OS start threshold value, unnecessary counter steering is not performed.

On the other hand, since the processing at S830 is performed when the judgment requirement C is satisfied at S810, the judgment at S910 becomes "YES" and the vehicle state quantity FB controlled-variable θ is outputted to the second ECU 40 as the IFS_ACT angle command value θact at S940.

As a result, the vehicle state quantity FB controlled-variable θ which is the IFS_ACT angle command value θact is added by the second ECU 40 to the ACT angle command value θ0* corresponding to the target rotation angle of the electric motor 32a of the IFS actuator 32 which is uniquely determined corresponding to the steering angle and the vehicle speed V with variable transfer ratio control processing. As a result, in the electric motor 32a of the IFS actuator 32, the counter steer operation is performed by the second ECU 40.

(Processing in Understeer Tendency)

In the control ON/OFF judgment calculation at S800, the device 20 of this embodiment judges that the degrees of grip ∈ is sufficient when the grip factor ∈ is equal to or more than the second US start threshold value ∈1 even if the vehicle state is understeer and the inequality |yaw rate ψ|>first US start threshold value is satisfied. In this case, the device 20 does not execute the processing at S840 and hence, the understeer control flag is not set. Accordingly, in the active counter steering ACT command angle calculation at S900 which is shown in FIG. 9, since the judgment is determined to be "NO" at S910 and S920, the value of "0" is outputted to the second ECU 40 as the IFS_ACT angle command value θact at S930.

As a result, the electric motor 32a of the IFS actuator 32 is controlled by the second ECU 40 with the ACT angle command value θ0* corresponding to the target rotation angle of the electric motor 32a of the IFS actuator 32 uniquely determined corresponding to the steering angle and the vehicle speed V with variable transfer ratio control processing.

On the other hand, since the processing at S840 is performed when the judgment requirement D is satisfied at S820, the judgment at S920 becomes "YES" and the correction steered angle θg is outputted to the second ECU 40 as the IFS_ACT angle command value θact at S950.

As a result, the correction steered angle θg which is the IFS_ACT angle command value θact is added by the second ECU 40 to the ACT angle command value θ0* corresponding to the target rotation angle of the electric motor 32a of the IFS actuator 32 which is uniquely determined corresponding to the steering angle and the vehicle speed V with variable transfer ratio control processing. As a result, the electric motor 32a of the IFS actuator 32 is controlled with a value obtained by adding θ0* to θg by the second ECU 40.

In this case, as the grip factor ∈ becomes small, the steering gear ratio is set to be large and the correction steered angle θg becomes small. In addition, the upper limit of the steering gear ratio is set near the lower limit region of the grip factor ∈. In this way, since the steering gear ratio of the IFS actuator 32 is set to be large, the steered wheels are turned small even if the steering angle by the steering wheel 21 is large, and hence, it is possible to keep the stability of vehicle behavior.

According to this embodiment, the following effects can be obtained.

(1) The steering device 20 of this embodiment has the first ECU 30 which is the steering torque detection means M1 and the assist torque detection means M2 as the steering force index detection means to detect the steering torque (steering force index) applied to the steering system from the steering wheel 21 (steering means) to the suspension. In addition, the first ECU 30 functions as the self-aligning torque estimation means for estimating a self-aligning torque generated in a front wheel on the basis of the steering torque. Moreover, the first ECU 30 estimates a side force (front wheel index) for a front wheel on the basis of the lateral acceleration and the yaw rate (vehicle state quantities) as the front wheel index estimation means. Furthermore, the first ECU 30 functions as the grip factor estimation means for estimating the grip factor $\epsilon$ for a front wheel on the basis of a change of the self-aligning torque to a side force. Then, the first ECU 30 functions as the judging means for judging whether the grip factor $\epsilon$ is below the second OS start threshold value (the first predetermined threshold value). Then, the second ECU 40 (variable transfer ratio control means) is made to control the transfer ratio according to the vehicle state when the grip factor $\epsilon$ is less than the second OS start threshold value.

For this reason, in an area where the vehicle stability on a high $\mu$ road deteriorates a little, it is possible to eliminate the unnecessary intervention of the IFS control by detecting the grip factor $\epsilon$ of the wheel and using this grip factor. Thus, the unnecessary counter steering is not performed. As a result, it is possible to implement the IFS control only in a situation that a vehicle whose grip factor drops becomes unstable.

(2) In the first embodiment, the first ECU 30 (oversteer judging means) judges on the basis of the vehicle state quantities whether the vehicle state is oversteer. Then, when the vehicle state is oversteer and the grip factor $\epsilon$ is below the second OS start threshold value (the first predetermined threshold value), the second ECU 40 enlarges the transfer ratio. As a result, it is possible to easily realize the operation and effects of the item (1).

(3) In the first embodiment, the first ECU 30 (understeer judging means) judges on the basis of the vehicle state quantities whether the vehicle state is understeer. Then, when the vehicle state is understeer and the grip factor $\epsilon$ is below the second US start threshold value (the second predetermined threshold value) $\epsilon$1, the second ECU 40 controls the transfer ratio according to the grip factor $\epsilon$.

In consequence, for example, the smaller the grip factor $\epsilon$ is, the larger the steering gear ratio is set to be. For this reason, it is possible to secure the stability of the vehicle behavior since the steered wheel is turned small even if the steering angle by the steering wheel 21 is large. (4) In the steering device 20 of this embodiment, the first ECU 30 functions as the target vehicle state quantity estimation means which estimates the target yaw angle, the target yaw rate, and the target slip angle (target vehicle state quantities). Then, the first ECU 30 functions as the correction value calculation means, and calculates the vehicle state quantity FB controlled-variable $\theta$ (correction value), which corrects the transfer ratio, on the basis of the difference between the vehicle state quantities, which the lateral acceleration sensor YG and the yaw rate sensor YS (vehicle state quantity detection means) detect, and the target yaw angle, the target yaw rate, and the target slip angle. Moreover, the first ECU 30 functions as the oversteer judging means for judging on the basis of the vehicle state quantities whether the vehicle state is oversteer. The second ECU 40 generates the ACT angle command value $\theta 0^*$ according to the vehicle speed V as the target command value of the transfer ratio, and adds the vehicle state quantity FB controlled-variable $\theta$ (correction value) to the ACT angle command value $\theta 0^*$ when the first ECU 30 judged that the state is oversteer. As a result, it is possible to easily realize the operation and effects of the item (2).

(5) The steering device 20 of this embodiment has the first ECU 30 (grip factor-responsive value calculation means) which calculates the correction steered angle $\theta g$ (grip factor-responsive value) relating to the transfer ratio according to the grip factor on the basis of the grip factor $\epsilon$. Moreover, the first ECU 30 is made to judge on the basis of the vehicle state quantities whether the vehicle state is understeer. The second ECU 40 generates the ACT angle command value $\theta 0^*$ according to the vehicle speed V as the target command value of the transfer ratio, and adds the correction steered angle $\theta g$ to the ACT angle command value $\theta O$ when the first ECU 30 judged that the state is understeer.

As a result, it is possible to easily realize the operation and effects of the item (3).

Second Embodiment

A second embodiment will be explained with reference to FIGS. 15 to 20. The same reference numerals and characters will be assigned to the parts which are the same as or corresponds to those in the first embodiment, their explanation will be omitted, and different parts will be explained mainly. The second embodiment relates to another aspect of estimation of the grip factor, and a front wheel slip angle is used as a front wheel index of the present invention.

Figure 15:
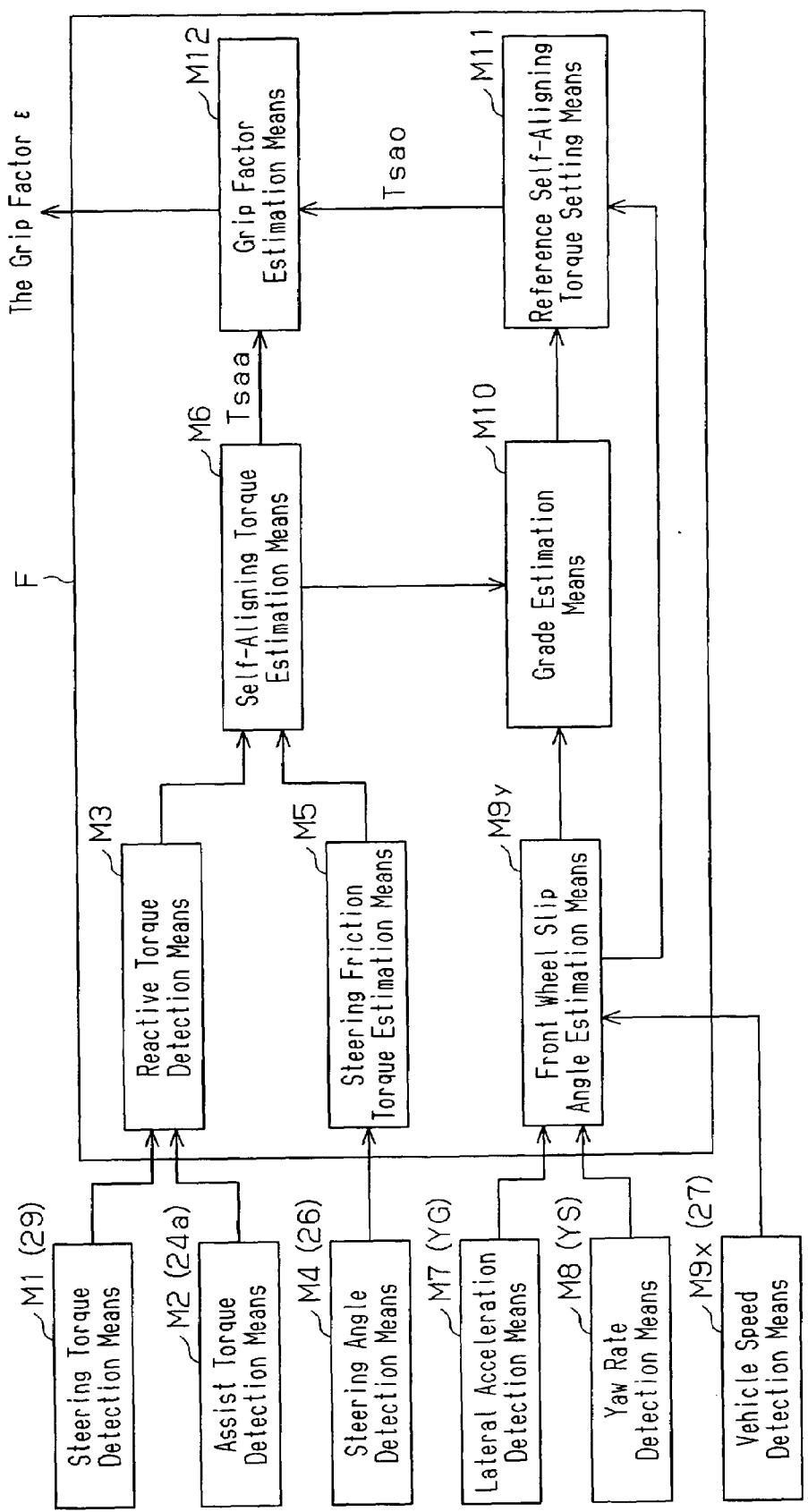
FIG. 15 is a control block diagram of a block F in another embodiment.

FIG. 15 is a block diagram of means for estimating the grip factor from the front wheel slip angle and a self-aligning torque. Reference characters M1 to M6 are the same as those in the first embodiment, a reactive torque and steering system friction torques will be calculated, and a self aligning torque will be estimated. On the other hand, since a front wheel slip angle is calculated from a steering angle, a yaw rate, lateral acceleration, and vehicle speed, similarly to FIG. 14 in the first embodiment, detection signals of the steering angle detection means M4, the lateral acceleration detection means M7, and the yaw rate detection means M8 are inputted into the front wheel slip angle estimation means M9y with a detection signal of the vehicle speed detection means M9x. The vehicle speed sensor 27 is equivalent to the vehicle speed detection means M9x.

In the front wheel slip angle estimation means M9y, first, vehicle body slip angular-velocity $d\beta/dt$ is calculated from the yaw rate, the lateral acceleration, and the vehicle speed, and the vehicle body slip angle $\beta$ is calculated by integrating this. A wheel slip angle, in particular, a wheel slip angle of a front wheel (hereinafter, this is referred to as a front wheel slip angle $\alpha f$) is calculated from the vehicle speed, the steering angle, and the vehicle specifications on the basis of this vehicle body slip angle $\beta$. In addition, the vehicle body slip angle $\beta$ may be also estimated on the basis of a vehicle model besides the method of integration, or may be also calculated with combining the estimation with the method of integration.

On the basis of the self aligning torque and the front wheel slip angle $\alpha f$ which are estimated as described above, a gradient of the self aligning torque near the origin is estimated by the grade estimation means M10, and the reference self aligning torque is set in the reference self aligning torque setting means M11 on the basis of this gradient and the front wheel slip angle. Then, on the basis of the comparison result of the reference self aligning torque set in the reference self aligning torque setting means M11, and the self aligning torque estimated by the self aligning torque estimation means M6, the grip factor ϵ for the front wheels is estimated in grip factor estimation means M12.

The estimation of the grip factor ϵ in the second embodiment will be explained in full detail below with reference to FIGS. 16 to 20.

Figure 16:
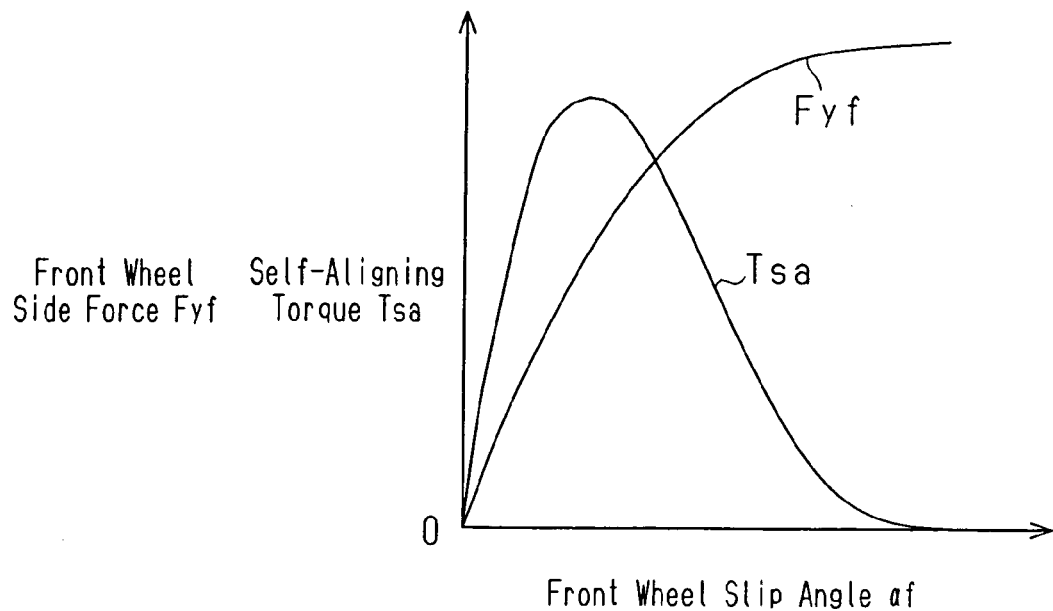
FIG. 16 is a graph showing relationships of the front wheel side force and self-aligning torque versus the front wheel slip angle in another embodiment.
Figure 17:
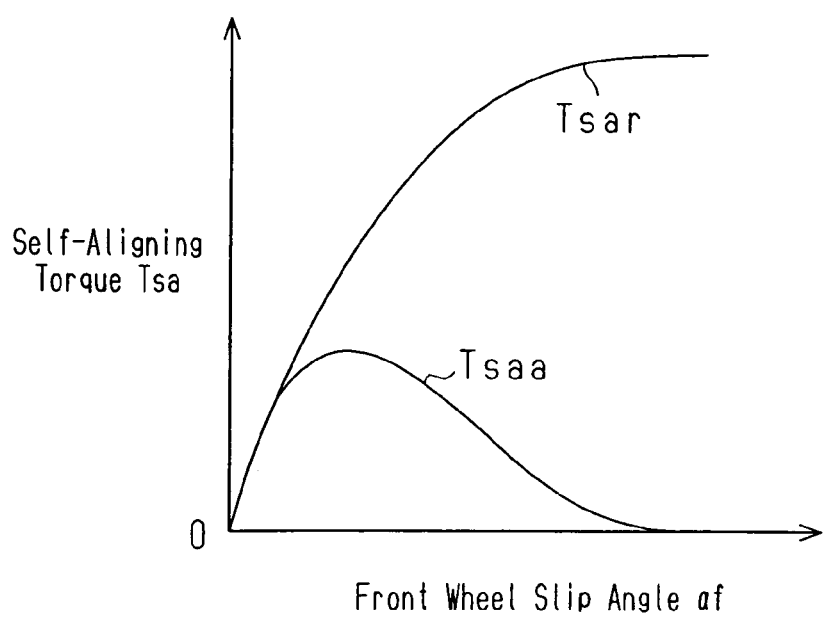
FIG. 17 is a graph showing a relationship of the self-aligning torque versus the front wheel slip angle similarly.

First, a relationship of the front wheel side force Fyf and the self aligning torque Tsa to the front wheel slip angle αf becomes non-linear to the front wheel slip angle αf as shown in FIG. 16. Since the self aligning torque Tsa becomes a product of the front wheel side force Fyf and the Trail e (e=en+ec), a self aligning torque characteristic at the time when the wheel (front wheel) is in a grip state, that is, in the case that the pneumatic trail en is in a complete grip state becomes non-linear as shown by Tsar in FIG. 17.

Figure 18:
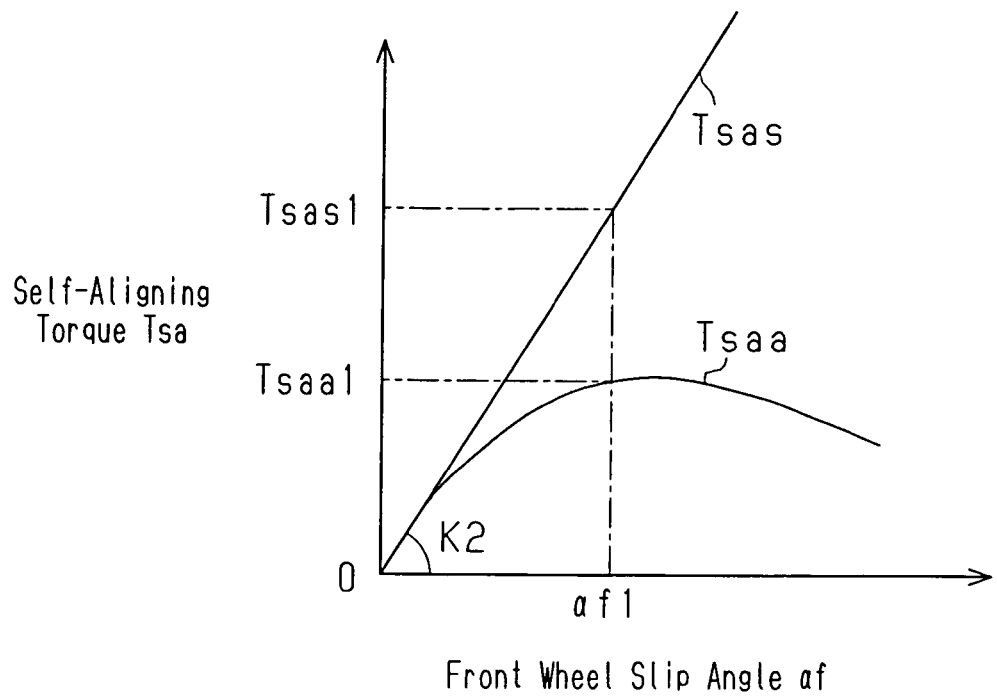
FIG. 18 is a graph showing a relationship of the self-aligning torque versus the front wheel slip angle similarly.

However, in this embodiment, assuming that the self aligning torque characteristic of a complete grip state is linear, as shown in FIG. 18, a gradient K2 of the self aligning torque Tsa to the front wheel slip angle near the origin is calculated, and the reference self aligning torque characteristic (this is shown by Tsas in FIG. 18) is set. For example, when the front wheel slip angle is αf1, the reference self-aligning torque is calculated with Tsas1=K2·αf1. Then, the grip factor ϵ is calculated using the equation ϵ=Tsaa1/Tsas1=Tsaa1/(K2·αf1).

Figure 19:
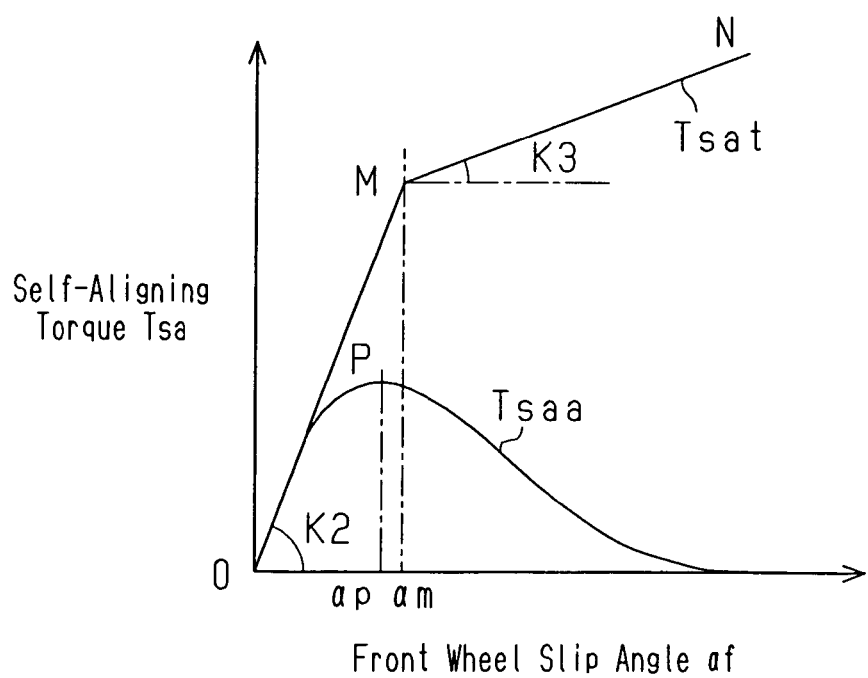
FIG. 19 is a graph showing a relationship of the self-aligning torque versus the front wheel slip angle similarly.

In the setting method of the reference self aligning torque in FIG. 18, since the reference self aligning torque characteristic is assumed to be linear, there is a possibility that the accuracy of estimation of the grip factor drops since an error generated at the time of estimation of the grip factor becomes large in an area where the front wheel slip angle αf is large. For this reason, as shown in FIG. 19, it is desirable to set the self aligning torque gradient as K3 in a region above a predetermined front wheel slip angle, and to set the nonlinearity of the reference self aligning torque characteristic with performing linear approximation like a line 0-M-N in FIG. 19. In this case, it is desirable to experimentally obtain beforehand and set the self-aligning torque gradient K3, and to identify and correct the gradient K3 in driving. In addition, it is favorable to set the point on the basis of a point of inflection (point P) of the actual self-aligning torque. For example, its sequence is to obtain the point of inflection, P of the actual self aligning torque, and to set the front wheel slip angle am, which is larger by a predetermined value than a front wheel slip angle αP of the point of inflection, P, as the point M.

Figure 20:
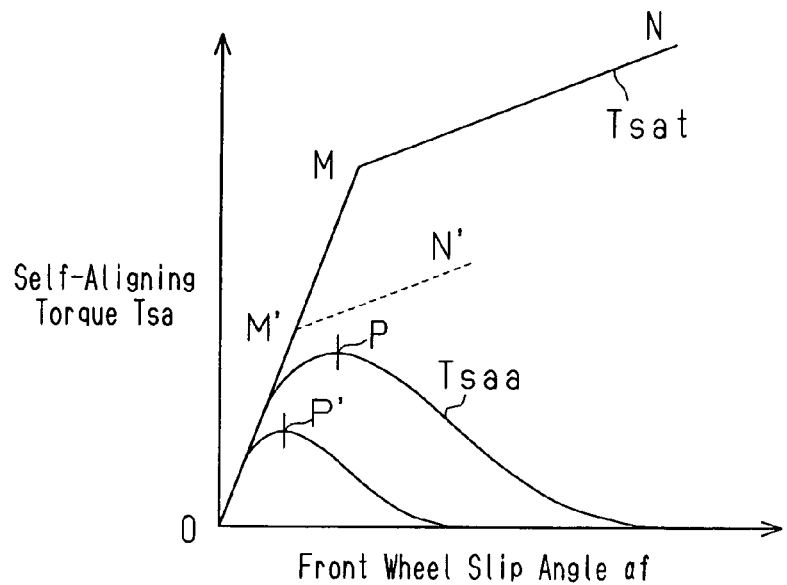
FIG. 20 is a graph showing a relationship of the self-aligning torque versus the front wheel slip angle similarly.

Moreover, it is possible to set a highly accurate reference self aligning torque characteristic by setting the reference self aligning torque on the basis of the point of inflection, P of the actual self aligning torque Tsaa as shown in FIG. 20 since the reference self aligning torque to the front wheel slip angle is affected by the road surface friction coefficient μ. For example, when the road surface friction coefficient becomes low, the characteristic of the actual self-aligning torque Tsaa changes from the continuous line to a dotted line in FIG. 20. Thus, when the road surface friction coefficient μ drops, the point of inflection of the actual self aligning torque Tsaa changes from the point P to a point P'.

Accordingly, it is necessary to change the reference self-aligning torque characteristic (Tsat) from the line 0-M-N to a line 0-M'-N'. In this case, as mentioned above, since the point M' is set on the basis of the point of inflection, P', it is possible to set the reference self aligning torque characteristic with following its change even if the road surface friction coefficient changes.

Accordingly, also in the second embodiment, the same effects as those in the first embodiment are exhibited by estimating the grip factor from the front wheel slip angle and the self-aligning torque.

In addition, the embodiment of the present invention can be also changed as follows.

(1) In each of above-mentioned embodiments, the grip factor ϵ is calculated on the basis of the self aligning torque with paying attention to the change of the pneumatic trail of a tire. However, it may be configured to estimate the grip factor (a grip factor in this case is expressed as ϵm) showing the extent of lateral grip for a wheel on the basis of a margin of the side force to the road surface friction as follows.

First, according to a theoretical model (brush model) of tire-generating forces, a relationship between the front wheel side force Fyf and the self-aligning torque Tsaa is expressed by the following formulas (3) to (6). In particular, relationships among the road surface friction coefficient μ, the ground load Fz, and the horizontal slip λ are expressed with the following formulas by using a parameter ξ. That is, assuming the equation ξ=1−{Ks/(3·μ·Fz)}·λ is satisfied, if the inequality ξ>0 is satisfied, $$Fyf = \mu \cdot Fz \cdot (1 - \xi^3) \tag{3}$$

if the inequality ξ≦0 is satisfied, $$Fyf = \mu \cdot Fz \tag{4}$$

And, moreover, if the inequality is ξ>0 is satisfied, $$Tsaa = (Lz \cdot Ks/6) \cdot \lambda \cdot \xi^3 \tag{5}$$

if the inequality ξ≦0 is satisfied, $$Tsaa = 0 \tag{6}$$

In addition, "^" expresses "power", and hence, "^3" expresses the third power.

Fz denotes a ground load, Lz denotes the ground length of a tire ground plane, Ks denotes a constant corresponding to tread stiffness, λ denotes a lateral slip (λ=tan(αf)), and αf denotes a front wheel slip angle.

Generally, in an area of ξ>0, since the front wheel slip angle αf is small, it is possible to handle it as λ=af. Apparently from the formula (3), since the maximum value of a side force is μ·Fz, it is possible to express η=1−ξ^3 with letting a rate of the side force according to a road surface friction coefficient μ to the maximum value be a road surface friction utilization factor η. Accordingly, ϵm−1−η can be referred to as a degree of road surface friction margin, and with letting this ϵm be a grip factor of a wheel, ϵm=ξ^3. Accordingly, the formula (5) can be expressed as the following formula (7).

$$Tsaa = (Lz \cdot Ks/6) \cdot \alpha f \cdot \epsilon m \tag{7}$$

The formula (7) shows that the self-aligning torque Tsaa is proportional to the front wheel slip angle αf and the grip factor ϵm. Then, with letting the characteristic at the grip factor ϵm=1 (the road surface friction utilization factor is zero, that is, the friction margin is 1) be a reference self-aligning torque characteristic, the characteristic becomes as the following formula (8).

$$Tsau = (Lz \cdot Ks/6) \alpha f \tag{8}$$

Accordingly, it is possible to calculate the grip factor ϵm using a following formula (9) from the formulas (7) and (8).

$$\epsilon m = Tsaa/Tsau \tag{9}$$

Apparently from the fact that the road surface friction coefficient μ is not included as a parameter in this formula (9), it is possible to calculate the grip factor ϵm without using the road surface friction coefficient μ. In this case, it is possible to set a gradient K4 (K4=Lz·Ks/6) of the reference self-aligning torque Tsau beforehand by using the brush model. In addition, it is also possible to obtain it experimentally. Moreover, if an initial value is set first, and the gradient of the self-aligning torque near a location where the front wheel slip angle is zero is fixed and corrected in driving, it is possible to increase detection accuracy.

Figure 21:
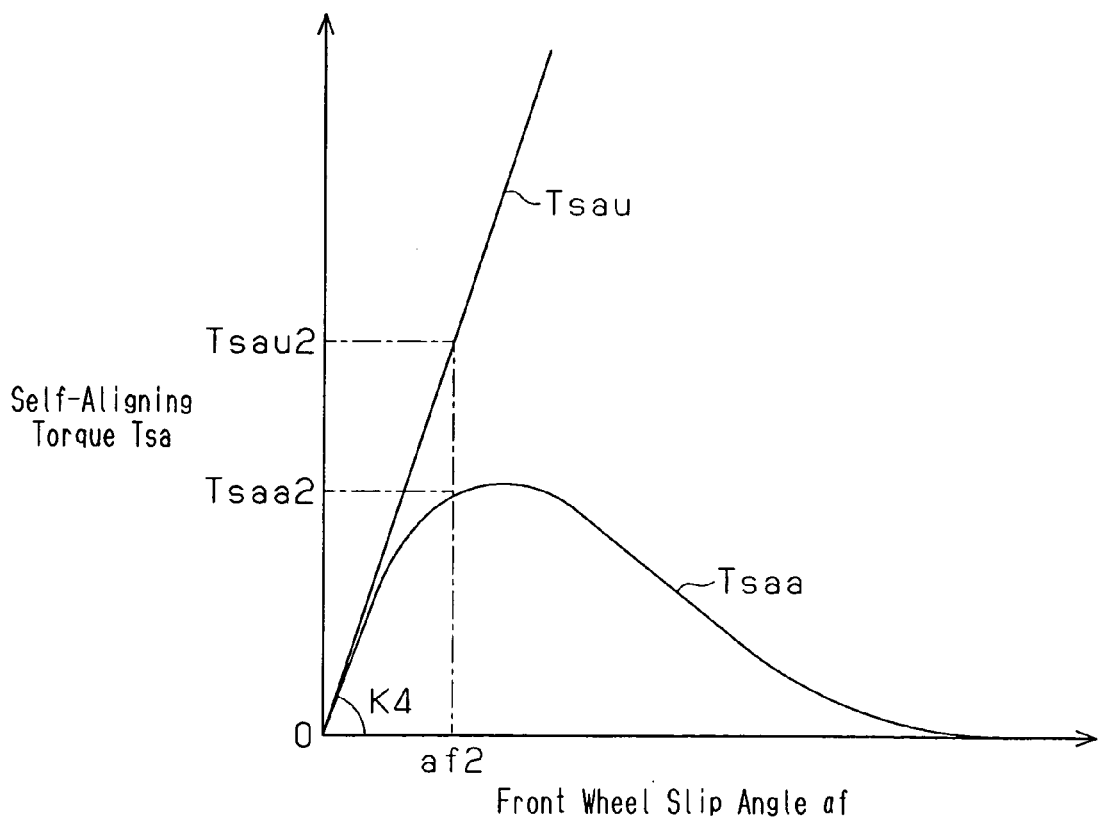
FIG. 21 is a graph showing a relationship of the self-aligning torque to the front wheel slip angle similarly.

For example, in FIG. 21, when the front wheel slip angle is αf2, the reference self-aligning torque is calculated by Tsau2=K4·αf2. Then, the grip factor ϵm is calculated using the equation ϵm=Tsaa2/Tsau2=Tsaa2/(K4·αf2).

Accordingly, it is possible to convert the calculated grip factor ϵ into the grip factor ϵm, and it is also possible to convert the calculated grip factor ϵm into the grip factor ϵ conversely.

In addition, when estimating the grip factor as described above by the comparison between the actual self aligning torque and reference self aligning torque, differently from Japanese Laid-Open Patent Publication No. 11-99956, it is possible to estimate the grip factor ϵ of a wheel on the basis of a pneumatic trail change without obtaining the road surface friction coefficient μ. Hence, in comparison with a conventional method of obtaining a road surface friction coefficient, estimation robustness is high, and accuracy is also superior.

(2) When a brushless DC motor is used as a motor 24a like the first embodiment, it may be configured to provide a rotational angle sensor in the motor 24a, to calculate the steering angle on the basis of it, and to use the steering angle for the IFS control in the block AO. For example, a steering angle sensor may be provided in a rack and pinion 5, and the steering angle may be calculated on the basis of this detection signal.

(3) In the first embodiment, S510 to S590 are executed for the steering characteristic (US/OS) calculation as shown in FIG. 7. Instead of S510 to S540, S505 and S515 may be executed prior to each processing of S550 to S590.

Thus, at S505, it is possible to directly calculate the slip angle difference from the vehicle speed V, the actual steered angle, and the yaw rate by a well known method. At S515, a deviation of difference is obtained by the time derivation of the calculated slip angle difference.

(4) In the first embodiment, S510 to S590 are executed for the steering characteristic (US/OS) calculation as shown in FIG. 7. Instead of S510 to S540, S525, S535, and S545 may be executed prior to each processing of S550 to S590.

Thus, at S525, the target yaw rate is calculated or is inputted from the block D1. In addition, when calculating the target yaw rate, the target yaw rate is calculated on the basis of the actual steered angle and the vehicle speed V of a vehicle. At S535, a differential value between the actual yaw rate and the target yaw rate is calculated. At S545, a time differentiation value of the differential value is calculated.

In addition, in this case, in the judgment of the steering characteristic at S550 and S570, the differential value means a differential value between the actual yaw rate and the target yaw rate, and the deviation of difference means a time differentiation value of the differential value between the actual yaw rate and the target yaw rate.

Accordingly, it is assumed that the weak US threshold value at S550 is set for the comparison with the differential value between the actual yaw rate and the target yaw rate. Specifically, the weak US threshold value is equivalent to the magnitude of a differential value generated at the time of an understeer tendency that the stability of a vehicle deteriorates a little although a driver does not sense a danger when he/she rapidly turns or returns the steering wheel on a high u road, and is a value obtained by test etc.

Moreover, it is assumed that the weak OS threshold value at S570 is set for the comparison with the differential value between the actual yaw rate and the target yaw rate. Specifically, the weak OS threshold value is equivalent to the magnitude of a differential value generated at the time of an oversteer tendency that the stability of a vehicle deteriorates a little at the time of returning the steering wheel although a driver does not sense a danger when he/she rapidly turns or returns the steering wheel on a high u road, or when largely circling the vehicle at low speed at the time of a U-turn or the like, and is a value obtained by test.

Moreover, similarly, it is assumed that the derivation of difference at S550 and S570 is set for the comparison with the derivation of difference between the actual yaw rate and the target yaw rate.

(5) In the control ON/OFF judgment calculation at S800 in the first embodiment, it is also acceptable to change the judgment requirement C and the judgment requirement D as follows.

(Judgment Requirement C)

Vehicle state=oversteer, |slip angle|>first OS start threshold value, and grip factor ϵ<second OS start threshold value In addition, the first OS start threshold value is a judgment threshold value for judging whether the magnitude of the slip angle reaches the magnitude at the time of oversteer, and is equivalent to the conventional control start threshold value described in the description of the related art. This judgment threshold value is a value obtained by test beforehand.

(Judgment Requirement D)

Vehicle state=understeer, |slip angle|>first US start threshold value, and grip factor ϵ<second US start threshold value ϵ1

In addition, the first US start threshold value is a judgment threshold value for judging whether the slip angle is the magnitude at the time of understeer. This judgment threshold value is a value obtained by test beforehand.

(6) Although the ACT angle command value θ0* is generated according to the vehicle speed in the block BO in the first and second embodiments, the ACT angle command value θ0* may be generated simply according to the steering angle. Moreover, the ACT angle command value θ0* may be generated according to the steering speed.

What is claimed is:

1. A vehicular steering device having steering means, a steering transmission system, a steering system, and a steered wheel, wherein the steering transmission system includes an electric motor and couples the steering means and a steered wheel, the steering system includes the steering means, a suspension, and components therebetween, and the device comprising:

change means which is provided in the steering transmission system, and is used for changing a transfer ratio between a steering angle of the steering means and a steered angle of the steered wheel by drive of the electric motor;

state quantity detection means for detecting vehicle state quantity which represents a vehicle state;

control means for controlling the electric motor and changing the transfer ratio according to the vehicle state quantity;

steering index detection means for detecting at least one steering index among steering indices containing a steering torque and a steering force which are applied to the steering system;

self-aligning torque estimation means for estimating a self-aligning torque generated in the steered wheel on the basis of the steering index;

steered wheel index estimation means for estimating at least one steered wheel index among steered wheel indices including a side force and a steered wheel slip angle to the steered wheel on the basis of the vehicle state quantity;

grip factor estimation means for estimating a grip factor at least to the steered wheel on the basis of a change of the self aligning torque to the steered wheel index; and judging means for judging whether the grip factor is less than a first predetermined threshold value, wherein the control means controls the transfer ratio according to the vehicle state when the grip factor is less than the first predetermined threshold value.

2. The vehicular steering device according to claim 1, further comprising:

oversteer judging means for judging on the basis of the vehicle state quantity whether the vehicle state is oversteer, wherein, when the vehicle state is oversteer and the grip factor is below the first predetermined threshold value, the control means increases the transfer ratio.

3. The vehicular steering device according to claim 1, further comprising:

understeer judging means for judging on the basis of the vehicle state quantity whether the vehicle state is understeer, wherein, when the vehicle state is understeer and the grip factor is below a second predetermined threshold value, the control means controls the transfer ratio according to the grip factor.

4. A vehicular steering device having steering means, a steering transmission system, a steering system, and a steered wheel, wherein the steering transmission system includes an electric motor and couples the steering means and a steered wheel, the steering system includes the steering means, a suspension, and components therebetween, and the device comprising:

change means which is provided in the steering transmission system, and is used for changing a transfer ratio between a steering angle of the steering means and a steered angle of the steered wheel by the drive of the electric motor;

state quantity detection means for detecting vehicle state quantity which represents a vehicle state;

vehicle speed detection means for detecting vehicle speed;

control means for controlling the electric motor and changing the transfer ratio according to the vehicle speed and the vehicle state quantity;

steering index detection means for detecting at least one steering index among steering indices containing a steering torque and a steering force which are applied to the steering system;

self-aligning torque estimation means for estimating a self-aligning torque generated in the steered wheel on the basis of the steering index;

steered wheel index estimation means for estimating at least one steered wheel index among steered wheel indices including a side force and a steered wheel slip angle to the steered wheel on the basis of the vehicle state quantity;

grip factor estimation means for estimating a grip factor at least to the steered wheel on the basis of a change of the self aligning torque to the steered wheel index; and judging means for judging whether the grip factor is less than a first predetermined threshold value, wherein the control means controls the transfer ratio according to the vehicle state when the grip factor is less than the first predetermined threshold value.

5. The vehicular steering device according to claim 4, further comprising:

oversteer judging means for judging on the basis of the vehicle state quantity whether the vehicle state is oversteer, wherein, when the vehicle state is oversteer and the grip factor is below the second predetermined threshold value, the control means increases the transfer ratio.

6. The vehicular steering device according to claim 4, further comprising:

understeer judging means for judging on the basis of the vehicle state quantity whether the vehicle state is understeer, wherein, when the vehicle state is understeer and the grip factor is below a second predetermined threshold value, the control means controls the transfer ratio according to the grip factor.

7. The vehicular steering device according to claim 4, further comprising:

target state quantity estimation means for estimating target vehicle state quantity;

correction value calculation means for calculating a correction value in order to correct the transfer ratio on the basis of the difference between the vehicle state quantity detected by the vehicle state quantity detection means and the target vehicle state quantity; and oversteer judging means for judging on the basis of the vehicle state quantity whether the vehicle state is oversteer, wherein the control means generates a target command value of the transfer ratio according to the vehicle speed and, adds the correction value to the target command value when the oversteer judging means judges that the state is oversteer.

8. The vehicular steering device according to claim 4, further comprising:

responsive value calculation means for calculating a grip factor-responsive value relating to the transfer ratio according to the grip factor on the basis of the grip factor; and understeer judging means for judging on the basis of the vehicle state quantity whether the vehicle state is understeer, wherein the control means generates a target command value of the transfer ratio according to the vehicle speed, and adds the grip factor-responsive value to the target command value when the understeer judging means judges that the state is understeer.

* * * * *